(12) United States Patent
Sakaguchi

(10) Patent No.: US 7,019,750 B2
(45) Date of Patent: Mar. 28, 2006

(54) DISPLAY STATUS MODIFYING APPARATUS AND METHOD, DISPLAY STATUS MODIFYING PROGRAM AND STORAGE MEDIUM STORING THE SAME, PICTURE PROVIDING APPARATUS AND METHOD, PICTURE PROVIDING PROGRAM AND STORAGE MEDIUM STORING THE SAME, AND PICTURE PROVIDING SYSTEM

(75) Inventor: Tatsumi Sakaguchi, Kanagawa (JP)

(73) Assignee: Sony Corporation, Tokyo (JP)

( * ) Notice: Subject to any disclaimer, the term of this patent is extended or adjusted under 35 U.S.C. 154(b) by 46 days.

(21) Appl. No.: 10/146,699

(22) Filed: May 14, 2002

(65) Prior Publication Data

US 2002/0186220 A1   Dec. 12, 2002

(30) Foreign Application Priority Data

May 15, 2001   (JP)   ............................. 2001-145582

(51) Int. Cl.
*G06T 15/70* (2006.01)
(52) U.S. Cl. ...................................... 345/475; 715/723
(58) Field of Classification Search ................ 345/797, 345/723, 724, 627–633, 473–475, 799; 715/723, 715/724, 799
See application file for complete search history.

(56) References Cited

U.S. PATENT DOCUMENTS 6,313,835 B1 * 11/2001 Gever et al. ................. 715/846
6,344,853 B1 *  2/2002 Knight ........................ 345/629
2001/0000962 A1    5/2001 Rajan

OTHER PUBLICATIONS

Avaro O et al: "The MPEG-4 systems and description languages: A way ahead in audio visual information representation" Signal Processing. Image Communication, Elsevier Science Publishers, Amsterdam, NL, vol. 0, No. 4, May 1997, pp. 385-431, XP004075337 ISSN: 0923-5965.

* cited by examiner

*Primary Examiner*—Kent Chang
(74) *Attorney, Agent, or Firm*—Finnegan, Henderson, Farabow, Garrett & Dunner, L.L.P.

(57) ABSTRACT

In a display status modifying apparatus, objects each including a temporally continuous picture of an arbitrary shape are received from outside, the objects are displayed on a predetermined display unit according to display specification information that specifies display status of the objects, and specified content of the display specification information is modified according to a modification instruction for modifying the display status of the objects displayed on the display unit, input via an input unit. Accordingly, intention of a user can be reflected, serving to popularize distribution of picture.

11 Claims, 35 Drawing Sheets

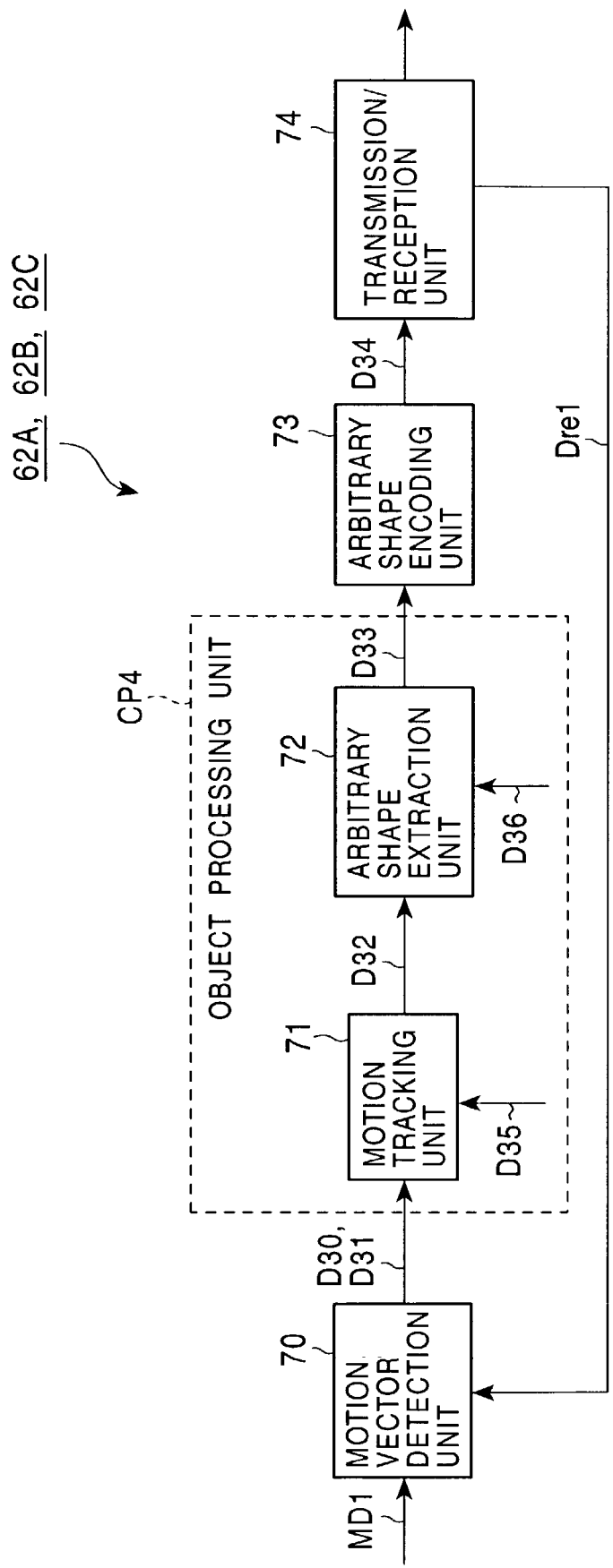

DISPLAY STATUS MODIFYING APPARATUS AND METHOD, DISPLAY STATUS MODIFYING PROGRAM AND STORAGE MEDIUM STORING THE SAME, PICTURE PROVIDING APPARATUS AND METHOD, PICTURE PROVIDING PROGRAM AND STORAGE MEDIUM STORING THE SAME, AND PICTURE PROVIDING SYSTEM

BACKGROUND OF THE INVENTION

1. Field of the Invention

The present invention relates to a display status modifying apparatus, a display status modifying method, a display status modifying program, a storage medium storing the same, a picture providing apparatus, a picture providing method, a picture providing program, a storage medium storing the same, and a picture providing system. The present invention may be suitably applied, for example, to a picture providing system constructed of a motion picture distribution server and a personal computer linked with each other via the Internet.

2. Description of the Related Art

Recently, picture providing systems, in which motion picture data being acquired by imaging a target with a video camera, etc. is distributed from a motion picture distribution server to a personal computer via the Internet so that motion picture based on the motion picture data is displayed in real time on a display unit of the personal computer, are becoming commonly available.

According to the picture providing systems, however, motion picture data is unilaterally distributed to the personal computer from the motion picture distribution server and motion picture based on the motion picture data is inflexibly displayed on the display unit of the personal computer. Thus, the picture providing systems have not necessarily been successful in providing motion picture as desired by the user, and thus have not been sufficient to popularize distribution of motion picture.

SUMMARY OF THE INVENTION

The present invention has been made in view of the above, and an object of thereof is to provide a display status modifying apparatus, a display status modifying method, a display status modifying program, a storage medium storing the same, a picture providing apparatus, a picture providing method, a picture providing program, a storage medium storing the same, and a picture providing system that serve to popularize distribution of picture.

To this end, according to one aspect of the present invention, an object including a temporally continuous picture of an arbitrary shape is received from outside, the object is displayed on a predetermined display unit according to display specification information that specifies a display status of the object, and specified content of the display specification information is modified according to a modification instruction for modifying the display status of the object displayed on the display unit, input via an input unit. Accordingly, intention of a user can be reflected, serving to popularize distribution of picture.

According to another aspect of the present invention, in a picture providing apparatus, an object including a temporally continuous picture of an arbitrary shape is generated, display specification information that specifies a display status of the object and in which modification of specified content of the display status is allowed is generated, and the object and the display specification information are transmitted; in a display status modifying apparatus, the object and the display specification information are received, the object is displayed on a predetermined display unit according to the display specification information, and specified content of the display specification information is modified according to a modification instruction for modifying the display status of the object displayed on the display unit, input via an input unit. Accordingly, a picture in which intention of a user is reflected can be provided, serving to popularize distribution of picture.

BRIEF DESCRIPTION OF THE DRAWINGS

FIG. 23 is a block diagram showing the construction of an arbitrary shape encoding apparatus according to the second embodiment;

DESCRIPTION OF THE PREFERRED EMBODIMENTS

Preferred embodiments of the present invention will now be described in detail with reference to the accompanying drawings.

1. First Embodiment

1.1 Overall Construction

Figure 1:
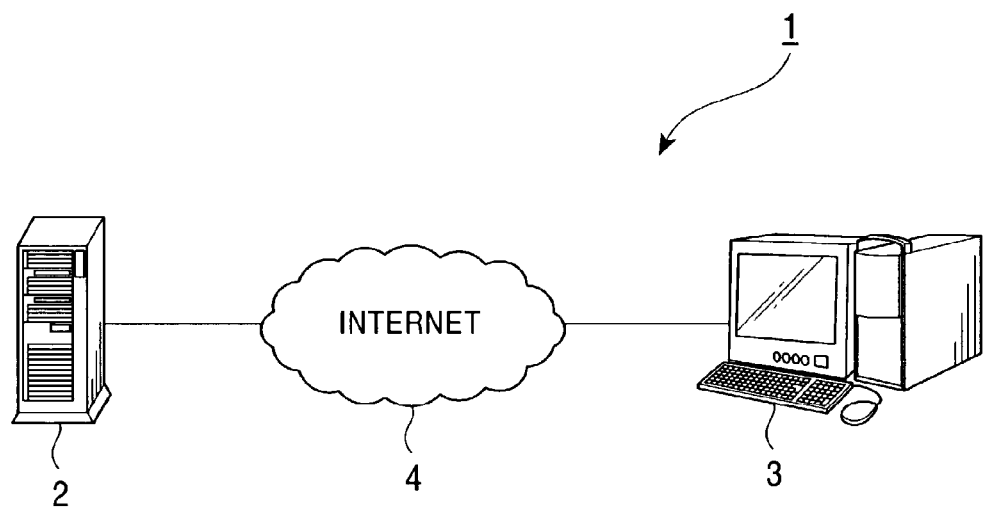
FIG. 1 is a block diagram showing the overall construction of a motion picture distribution system according to a first embodiment of the present invention.

Referring to FIG. 1, a motion picture providing system 1 according to a first embodiment of the present invention is constructed by linking a motion picture distribution server 2 on the providing side and a personal computer 3 via the Internet 4.

The motion picture distribution server 2 tracks a predetermined area (hereinafter referred to as a tracking area) in frame pictures based on frame data constituting motion picture data to be distributed, and compression-encodes each unit of extracted picture data of extracted pictures extracted from the tracking area, distributing the encoded data to the personal computer 3.

The personal computer 3 is arranged such that, each time encoded data is distributed from the motion picture distribution server 2, objects based on associated extracted picture data can be sequentially displayed thereon.

1.2 Construction of Motion Picture Distribution Server

Figure 2:
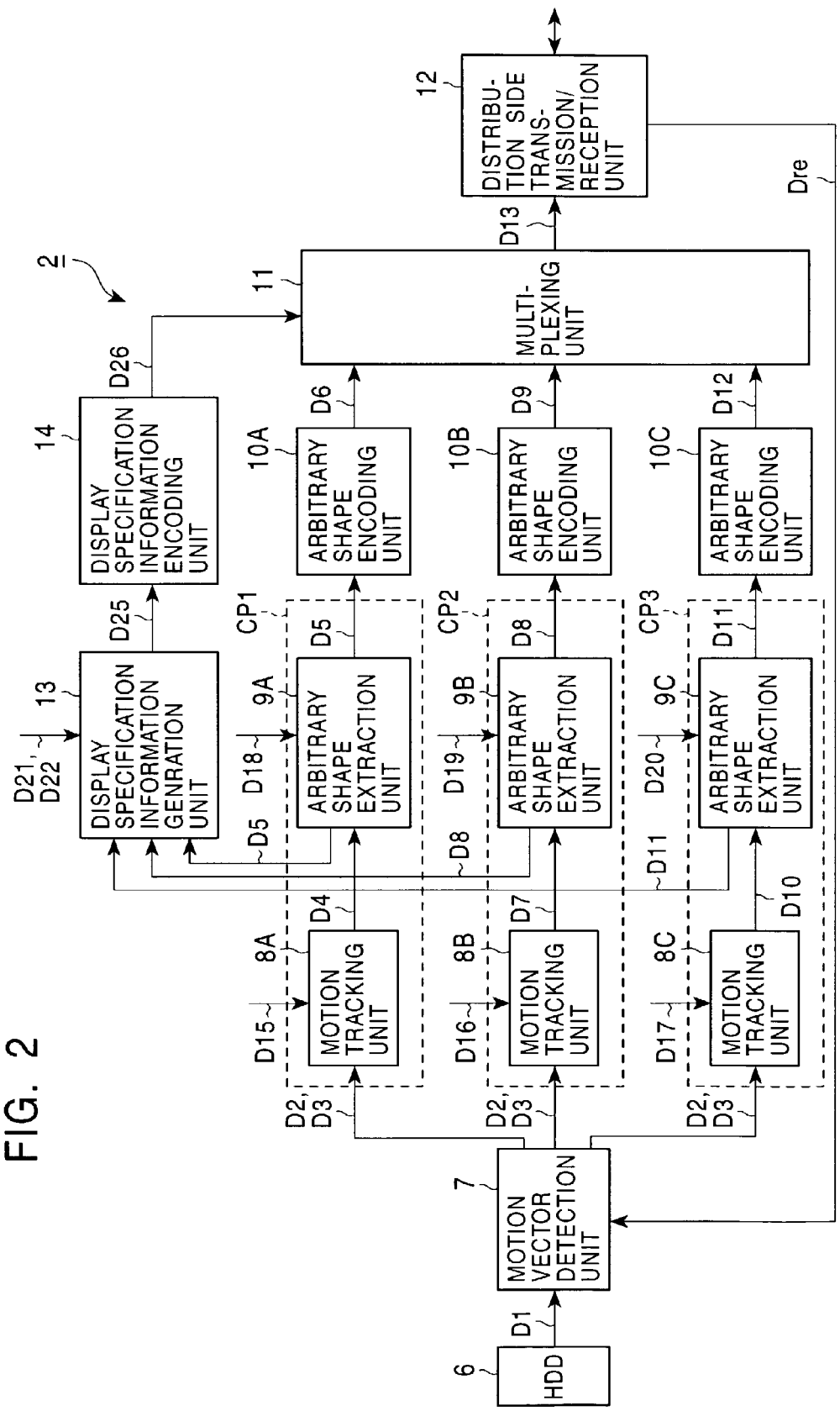
FIG. 2 is a block diagram showing the construction of a motion picture distribution server according to the first embodiment.

Referring to FIG. 2, when a motion vector detection unit 7 of the motion picture distribution server 2 receives motion picture distribution request data Dre transmitted from the personal computer 3 via a distribution-side transmission/reception unit 12, the motion vector detection unit 7 reads frame data (hereinafter referred to as subject frame data) D1 to be encoded from motion picture data MD stored in an HDD 6, and divides it into a plurality of macro blocks, generating divided subject frame data (hereinafter referred to as divided frame data).

The motion vector detection unit 7 reads reference frame data that is, for example, temporally previous relative to the divided frame data D2, and detects motion vector data D3 of each of the macro blocks by block matching of the divided frame data D2 and the reference frame data, forwarding the motion vector data D3 and the divided frame data D2 to each of object processing units CP1, CP2, and CP3.

A motion tracking unit 8A of the object processing unit CP1 is adapted to receive input of tracking specification data D15 specifying a rectangular tracking area including, for example, a person to be tracked in the frame picture based on the divided frame data D2.

Figure 3:
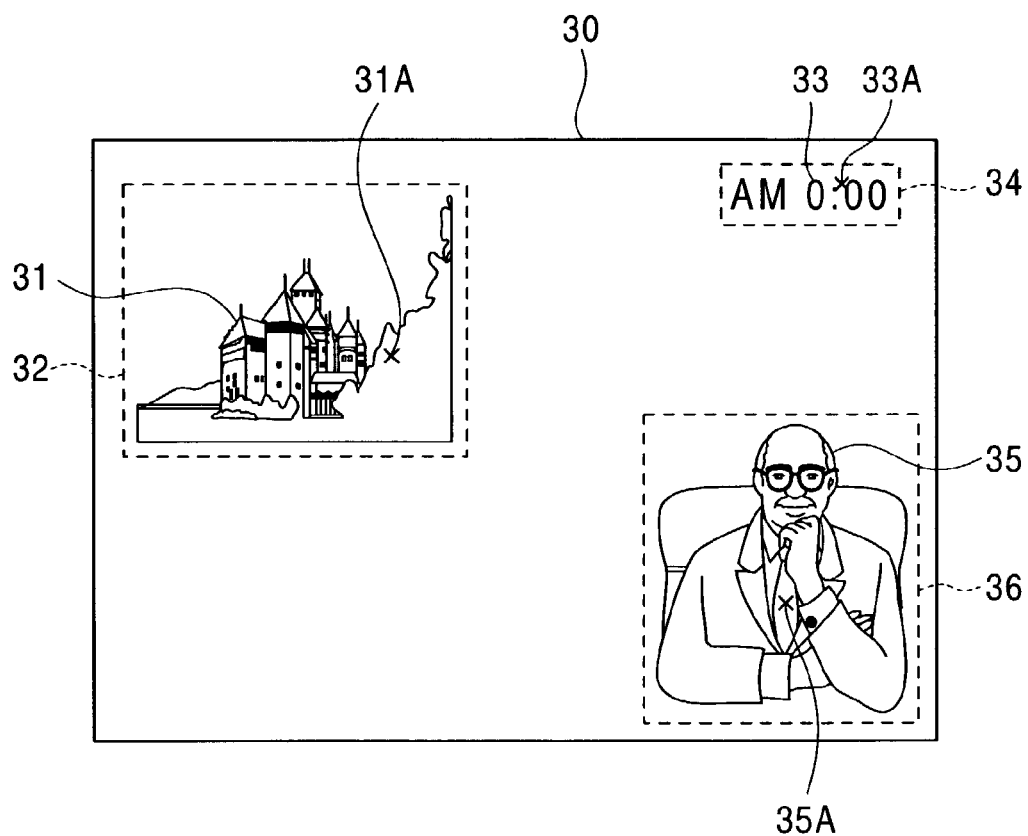
FIG. 3 is a schematic diagram showing a first example of tracking area specification.

In this embodiment, in the motion tracking unit 8A, for example, as shown in FIG. 3, a tracking area (hereinafter referred to as a scenery tracking area) 32 including a scenery picture (hereinafter referred to as a scenery object) 31 in the proximity of the top left corner of a frame picture 30 based on frame data is specified in advance by the tracking specification data D15.

Thus, out of the motion vector data D3 forwarded from the motion vector detection unit 7, the motion tracking unit 8A (FIG. 2) uses the motion vector data of all the macro blocks associated with the scenery tracking area 32 to roughly detect the movement of each of the macro blocks associated with the scenery tracking area 32 between each adjacent pair of divided frame data D2 forwarded from the motion vector detection unit 7.

Furthermore, the motion tracking unit 8A detects the scenery tracking area 32, having been roughly detected, now more specifically by line matching between each adjacent pair of divided frame data D2 so that the movement of each of the macro blocks associated with the scenery tracking area 32 is detected with high precision.

Figure 4:
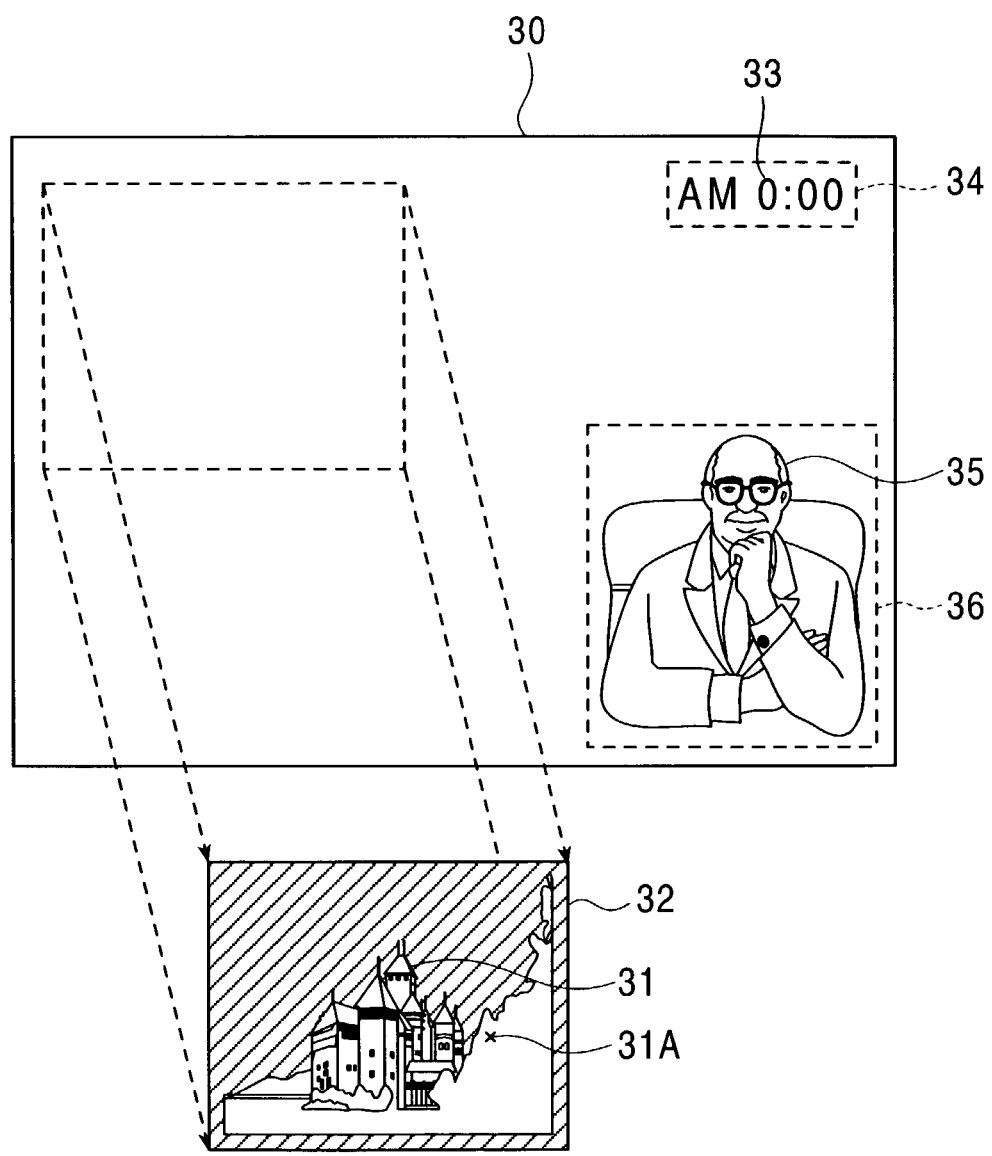
FIG. 4 is a schematic diagram showing a first example of object extraction.

Furthermore, the motion tracking unit 8A separates the scenery tracking area 32 specified by the tracking specification data D15, as shown in FIG. 4, forwarding it to an arbitrary shape extraction unit 9A as scenery tracking data D4 (FIG. 2).

The arbitrary shape extraction unit 9A is adapted to accept from outside, when the tracking specification data D15 is input to the motion tracking unit 8A, input of extraction specification data D18 specifying an arbitrary point on an object, whereby an object to be extracted from the tracking area specified by the tracking specification data D15 is specified.

In this embodiment, as shown in FIG. 3, in the arbitrary shape extraction unit 9A, an arbitrary point 31A that specifies the scenery object 31 is specified by the extraction specification data D18.

Thus, as shown in FIG. 4, the arbitrary shape extraction unit 9A detects the edge of the scenery object 31 from the scenery tracking area 32 based on the scenery tracking data D4 forwarded from the motion tracking unit 8A, with an assumption that the center of the scenery object 31 is a pixel associated with the point 31A specified by the extraction specification data D18, leaving the original picture as it is inside the edge while replacing the outside with, for example, pixels representing black so that it will not be displayed on the reception side, whereby the scenery object 31 is extracted.

Figure 5:
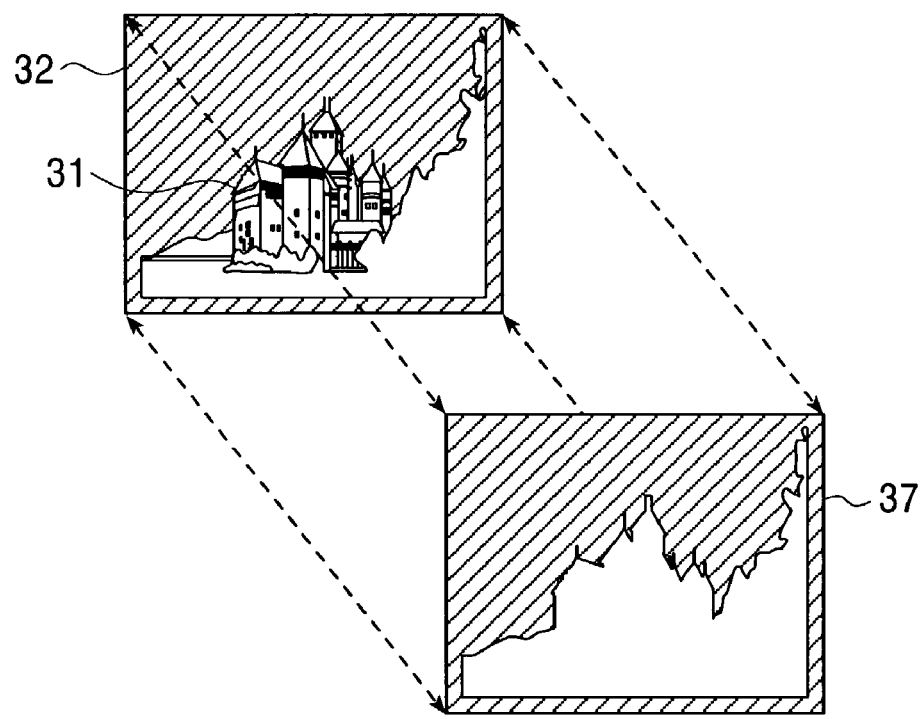
FIG. 5 is a schematic diagram showing the configuration of a mask picture for specifying the shape of an object.

Furthermore, the arbitrary shape extraction unit 9A generates a mask pattern picture 37 for exposing the extracted scenery object 31 while covering the area other surrounding the scenery object 31 so that the shape of the scenery object 31 will be presented to the reception side, as shown in FIG. 5.

The arbitrary shape extraction unit 9A forwards data of the extracted scenery object 31 (in this case including the surrounding area in the scenery tracking area 32, replaced with black pixels) and data of the mask pattern picture 37 (hereinafter referred to as mask pattern data) to an arbitrary shape encoding unit 10A as scenery object data D5 (FIG. 2).

The arbitrary shape encoding unit 10A compresses and encodes the object data in the scenery object data D5, by the unit of macro block of the same size as that in the original picture, by a relatively low compression rate based on MPEG4 compression encoding, generating encoded data, and also compresses and encodes the mask pattern data in the scenery object data D5 by a relatively low compression rate, generating encoded mask pattern data.

The arbitrary shape encoding unit 10A forwards the encoded data and encoded mask pattern data to a multiplexing unit 11 as encoded scenery data D6.

As described above, each time the divided frame data D2 is input from the motion vector detection unit 7, the object processing unit CP1 sequentially detects the movement of each of the macro blocks associated with the scenery tracking area 32 specified by the tracking specification data D15 from the frame pictures based on the divided frame data D2, thereby separating the scenery tracking area 32.

Upon each time separating the scenery tracking area 32, the object processing unit CP1 sequentially compresses and encodes, according to MPEG4, the scenery object data D5 of the scenery object 31 extracted from the scenery tracking area 32 based on the extraction specification data D18, generating the encoded scenery data D6, and forwards it to the multiplexing unit 11.

Similarly to the motion tracking unit 8A, motion tracking units 8B and 8C are adapted to accept input of tracking specification data D16 and D17, respectively, each specifying a rectangular tracking area including, for example, a person to be tracked in the frame pictures based on the divided frame data D2. Also, similarly to the arbitrary shape extraction unit 9A, arbitrary shape extraction units 9B and 9C are adapted to accept from outside, when the tracking specification data D16 and D17 are input to the motion tracking units 8B and 8C, input of extraction specification data D19 and D20, respectively, each specifying an arbitrary point on an object, whereby objects to be extracted from the tracking areas specified by the tracking specification data D16 and D17 are specified.

In this embodiment, as shown in FIG. 3, in the motion tracking unit 8B, a tracking area (hereinafter referred to as a telop tracking area) 34 including a telop (hereinafter referred to as a telop object) 33 in the proximity of the top right corner of the frame picture 30 based on the frame data is specified in advance by the tracking specification data D16. In the motion tracking unit 8C, a tracking area (hereinafter referred to as a person tracking area) 36 including a picture of a person (hereinafter referred to as a person object) 35 in the proximity of the bottom right corner of the frame picture 30 based on the frame data is specified in advance by the tracking specification data D17.

Furthermore, in the arbitrary shape extraction unit 9B, an arbitrary point 33A that specifies the telop object 33 is specified by the extraction specification data D19. In the arbitrary shape extraction unit 9C, an arbitrary point 35A that specifies the person object 35 is specified by the extraction specification data D20.

Thus, similarly to the object processing unit CP1, each time the divided frame data D2 is input from the motion vector detection unit 7, the object processing units CP2 and CP3 (FIG. 2) detect the movement of each of the macro blocks associated with the telop tracking area 34 and the person tracking area 36 specified by the tracking specification data D16 and D17 from the frame pictures based on the divided frame data D2, separating the telop tracking area 34 and the person tracking area 36, respectively (telop tracking data D7 and person tracking data D10).

Upon each time separating the telop tracking area 34 and the person tracking area 36, the object processing units CP2 and CP3 sequentially compress and encode, according to MPEG4, telop object data D8 of the telop object 33 and person object data D11 of the person object 35 extracted from the telop tracking area 34 and the person tracking area 36 based on the extraction specification data D19 and D20, respectively, generating encoded telop data D9 and encoded person data D12, and forwards them to the multiplexing unit 11.

A display specification information generation unit 13 calculates a center coordinate point and a reference point of the scenery object 31 based on the scenery object data D5 forwarded from the arbitrary shape extraction unit 9A, a center coordinate point and a reference point of the telop object 33 based on the telop object data D8 forwarded from the arbitrary shape extraction unit 9B, and a center coordinate point and a reference point of the person object 35 based on the person object data D11 forwarded from the arbitrary shape extraction unit 9C, for each divided frame data D2 of, for example, 60 frames (hereinafter referred to as a frame data set).

The display specification information generation unit 13 also calculates, for each frame data set, a picture size of the scenery object 31, a picture size of the telop object 33, and a picture size of the person object 35 based on the object data D5, D8, and D11 forwarded from the arbitrary shape extraction units, 9A, 9B, and 9C, respectively.

The display specification information generation unit 13 is adapted to accept from outside, when the tracking specification data D15, D16, and D17 are input to the motion tracking units 8A, 8B, and 8C, respectively, input of display specification data D21 specifying whether or not to display each of the object and layer order specification data D22 specifying an order of displaying the objects overlappingly (hereinafter referred to as layer order).

In this embodiment, in the display specification information generation unit 13, the scenery object 31, the telop object 33, and the person object 35 are specified for display by the display specification data D21, and the scenery object 31 is specified to be on the uppermost layer, the telop object 33 on the intermediate layer, and the person object 35 on the lowermost layer by the layer order specification data D22.

The display specification information generation unit 13 forwards the center coordinate point and the reference point of each of the objects and the picture size of each of the objects, calculated for each frame data set, and the display specification data D21 and the layer order specification data D22, supplied from outside, to a display specification information encoding unit 14 as display specification information D25 for specifying display status of each of the objects.

The display specification information generation unit 13 generates the display specification information D25 on the basis of each frame data set, not on the basis of each divided frame data D2, so that the load of the encoding process by the display specification information encoding unit 14, to which the display specification information D25 is forwarded, will be minimized.

Upon each time receiving the display specification information D25 forwarded from the display specification information generation unit 13, the display specification information encoding unit 14 sequentially compresses and encodes the display specification information D25, generating encoded display specification data D26, and forwards it to the multiplexing unit 11.

Upon each time receiving the encoded display specification data D26 forwarded from the display specification information generation unit 13, and the encoded scenery data D6, the encoded telop data D9, and the encoded person data D12 forwarded from the arbitrary shape encoding units 10A, 10B, and 10C, respectively, the multiplexing unit 11 multiplexes them as required to generate multiplexed data D13, which is distributed to the personal computer 3 via the distribution-side transmission/reception unit 12.

1.3 Procedure of Providing Picture

Figure 6:
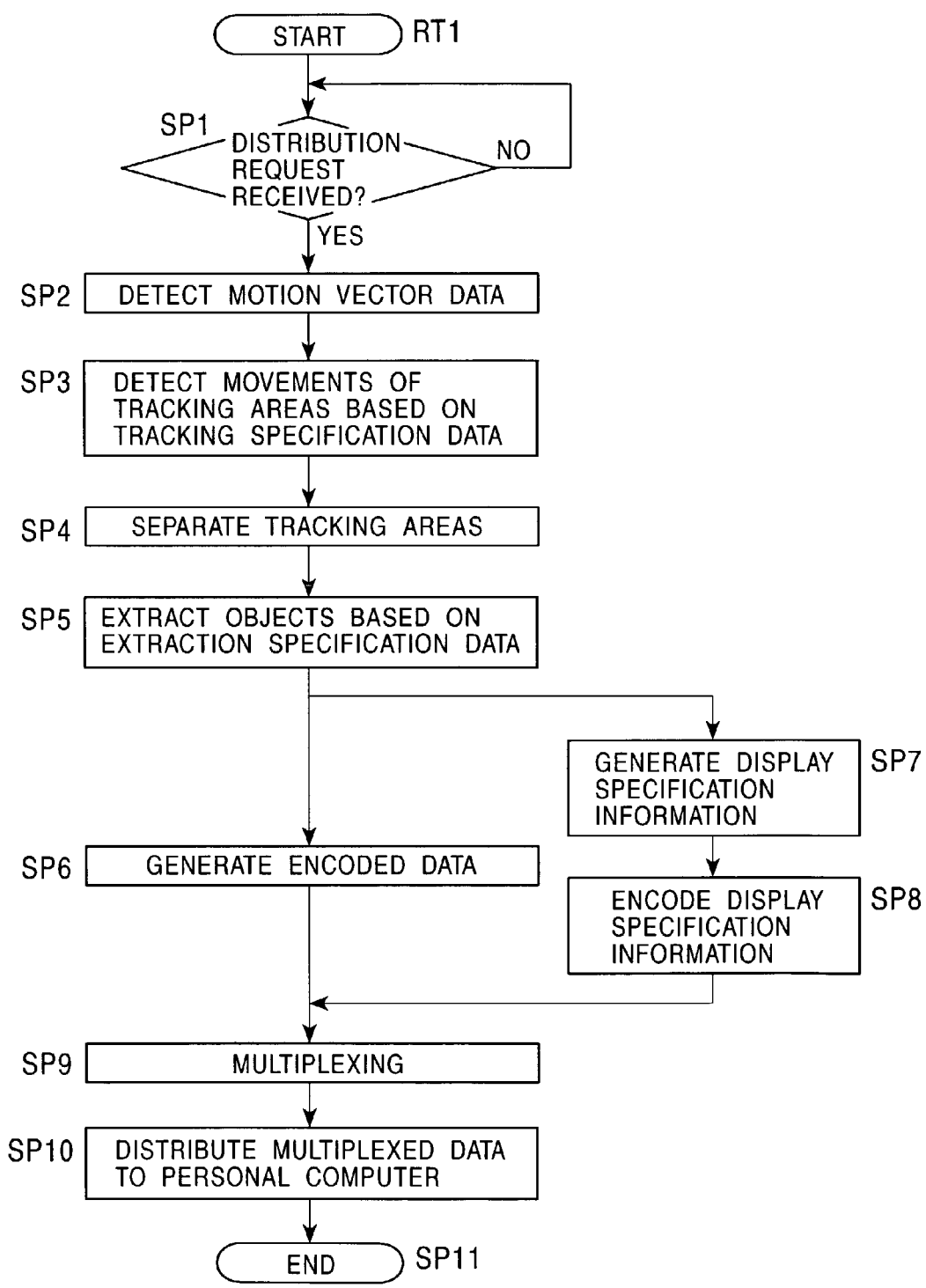
FIG. 6 is a flowchart showing the procedure of a motion picture distribution process.

The procedure for providing a picture from the motion picture distribution server 2 to the personal computer 3 will be summarized below. Referring to FIG. 6, upon starting a routine RT1, the motion picture distribution server 2 enters step SP1.

In step SP1, the motion picture distribution server 2 determines whether a request for distributing a motion picture has been received from the personal computer 3. If the test turns out negative, indicating that motion picture distribution request data Dre has not been received from the personal computer 3, the motion picture distribution server 2 waits until a motion picture distribution request is received from the personal computer 3.

If the test turns out positive, indicating that motion picture distribution request data Dre has been received from the personal computer 3, the motion picture distribution server 2 proceeds to step SP2.

In step SP2, the motion picture distribution server 2 detects motion vector data D2 of each of the macro blocks by block matching, and then proceeds to step SP3.

In step SP3, the motion picture distribution server 2 detects the movement of each of the macro blocks associated with the tracking areas 32, 34, and 36 specified by tracking specification data D15 to D17, respectively, and then proceeds to step SP4.

In step SP4, the motion picture distribution server 2 separates the tracking areas 32, 34, and 36 specified by the tracking specification data D15 to D17 based on the detected movement of each of the macro blocks associated with the tracking areas 32, 34, and 36, respectively, and then proceeds to step SP5.

In step SP5, the motion picture distribution server 2 extracts the objects 31, 33, and 35 from the separated tracking areas 32, 34, and 36 based on the extraction specification data D18 to D20, respectively, and then proceeds to steps SP6 and SP7.

In step SP6, the motion picture distribution server 2 compresses and encodes the object data D5, D8, and D11 of the objects 31, 33, and 35 according to MPEG4, generating encoded data D6, D9, and D12, and then proceeds to step SP9.

In step SP7, the motion picture distribution server 2 calculates a center coordinate point, a reference point, and a picture size of each of the objects 31, 33, and 35 for each frame data set, generating display specification information D25 including the center coordinate point and the reference point of each of the objects, the picture size of each of the objects, the display specification data D21, and the layer order specification data D22, and then proceeds to step SP8.

In step SP8, the motion picture distribution server 2 compresses and encodes the display specification information D25 according to MPEG4, generating encoded display specification data D26, and then proceeds to step SP9.

In step SP9, the motion picture distribution server 2 multiplexes the compression-encoded data D6, D9, D12 and the encoded display specification data D26 as required to generate multiplexed data D13, and then proceeds to step SP10.

In step SP10, the motion picture distribution server 2 distributes the multiplexed data D13 to the personal computer 3, and then exits the motion picture distribution process procedure of the routine RT1 in step SP11.

As described above, the motion picture distribution server 2, upon receiving motion picture distribution request data Dre transmitted from the personal computer 3, generates the display specification information D25 for each frame data set, specifying the display status of the scenery object 31, the telop object 33, and the person object 35 to be distributed, and compresses and encodes the display specification information D25 to generate the encoded display specification data D26, distributing it to the personal computer 3.

Furthermore, the motion picture distribution server 2 tracks the tracking areas 32, 34, and 36 in the frame pictures based on the subject frame data D1 and extracts the objects 31, 33, and 35 from the tracking areas 32, 34, and 36, respectively, and sequentially compresses and encodes the scenery object data D5, the telop object data D8, and the person object data D11 of the extracted objects 31, 33, and 35 to generate encoded scenery object data D6, encoded telop data D9, and encoded person data D12, distributing them to the personal computer 3.

1.4 Construction of Personal Computer

Figure 7:
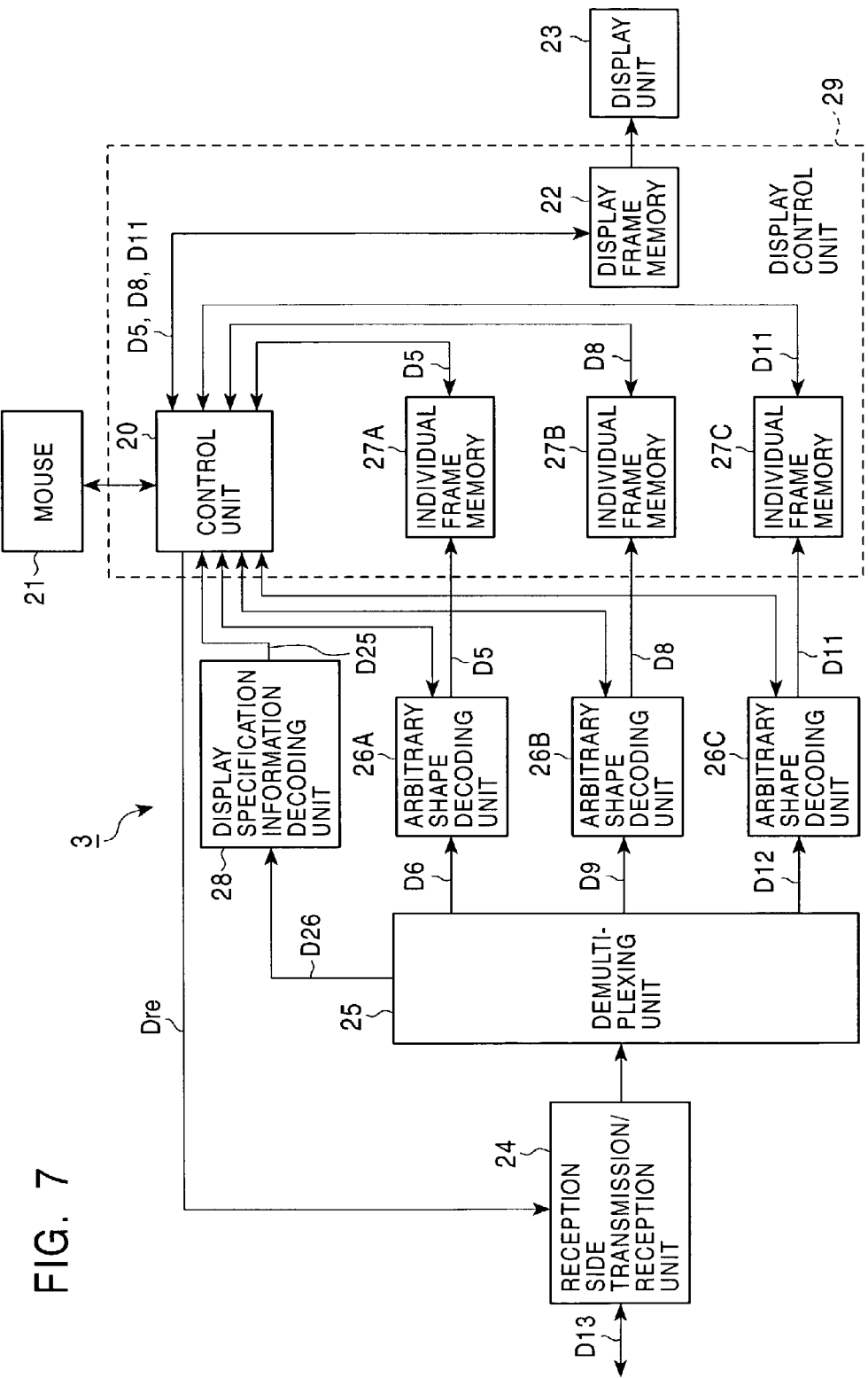
FIG. 7 is a block diagram showing the construction of a personal computer according to the first embodiment.

Referring to FIG. 7, a control unit 20 of a display control unit 29 of the personal computer 3 has a basic program for executing basic operations on the personal computer 3, such as Windows 2000 (trademark of Microsoft Corporation), loaded in advance in an internal RAM, so that when a predetermined operation for requesting distribution of a motion picture is made via a mouse 21 for input operations, the control unit 20 generates motion picture request data Dre and transmits it to the motion picture distribution server 2 on the distribution side.

Upon receiving the multiplexed data D13 distributed from the motion picture distribution server 2 via a reception side transmission/reception unit 24, a demultiplexing unit 25 demultiplexes the multiplexed data D13 into the encoded display specification data D26, the encoded scenery data D6, the encoded telop data D9, and the encoded person data D12, and forwards them to a display specification information decoding unit 28, an arbitrary shape decoding unit 26A, an arbitrary shape decoding unit 26B, and an arbitrary shape decoding unit 26C, respectively.

Upon receiving the encoded scenery data D6 forwarded from the demultiplexing unit 25, the arbitrary shape decoding unit 26A decodes the encoded scenery data D6 to restore the original scenery object data D5, and stores it in an individual frame memory 27A of the display control unit 29.

Similarly to the arbitrary shape decoding unit 26A, the arbitrary shape decoding units 26B and 26C, upon receiving the encoded telop data D9 and the encoded person data D12 forwarded from the demultiplexing unit 25, decodes the encoded telop data D9 and the encoded person data D12 to restore the original telop object data D8 and the original person object data D11, and store them in individual frame memories 27B and 27C of the display control unit 29, respectively.

The display specification information decoding unit 28, upon receiving the encoded display specification data D26 forwarded from the demultiplexing unit 25, decodes the encoded display specification data D26 to restore the original display specification information D25, and forwards it to the control unit 20 of the display control unit 29.

Upon receiving the display specification information D25 forwarded from the display specification information decoding unit 28, the control unit writes the display specification information D25 to the internal RAM. The layer order specification data D22 in the display specification information D25 is arranged such that the control unit 20 repeatedly reads from the individual frame memories 27C, 27B, and 27A in that order according to the specified layer order (the scenery object 31 on the uppermost layer, the telop object 33 on the intermediate layer, and the person object 35 on the lowermost layer).

Thus, the control unit 20 repeatedly reads the person object data D11, the telop object data D8, and the scenery object data D5 in that order from the individual frame memories 27C, 27B, and 27A, respectively, according to the layer order specification data D22 in the display specification information D25, and stores them in a display frame memory 22.

Then, the control unit 20 determines the configuration as to position and size (hereinafter referred to as display configuration) of each of the person object 35 based on the person object data D11, the telop object 33 based on the telop object data D8, and the scenery object 31 based on the scenery object data D5 in the display frame memory 22, according to the display specification data D21, the center coordinate point and the reference point of each of the objects, and the picture size of each of the objects in the display specification information D25.

The control unit 20 outputs the person object 35, the telop object 33, and the scenery object 31 to the display unit 23 according to the display configuration thus determined, whereby the objects 31, 33, and 35 are displayed on the display unit 23.

Figure 8:
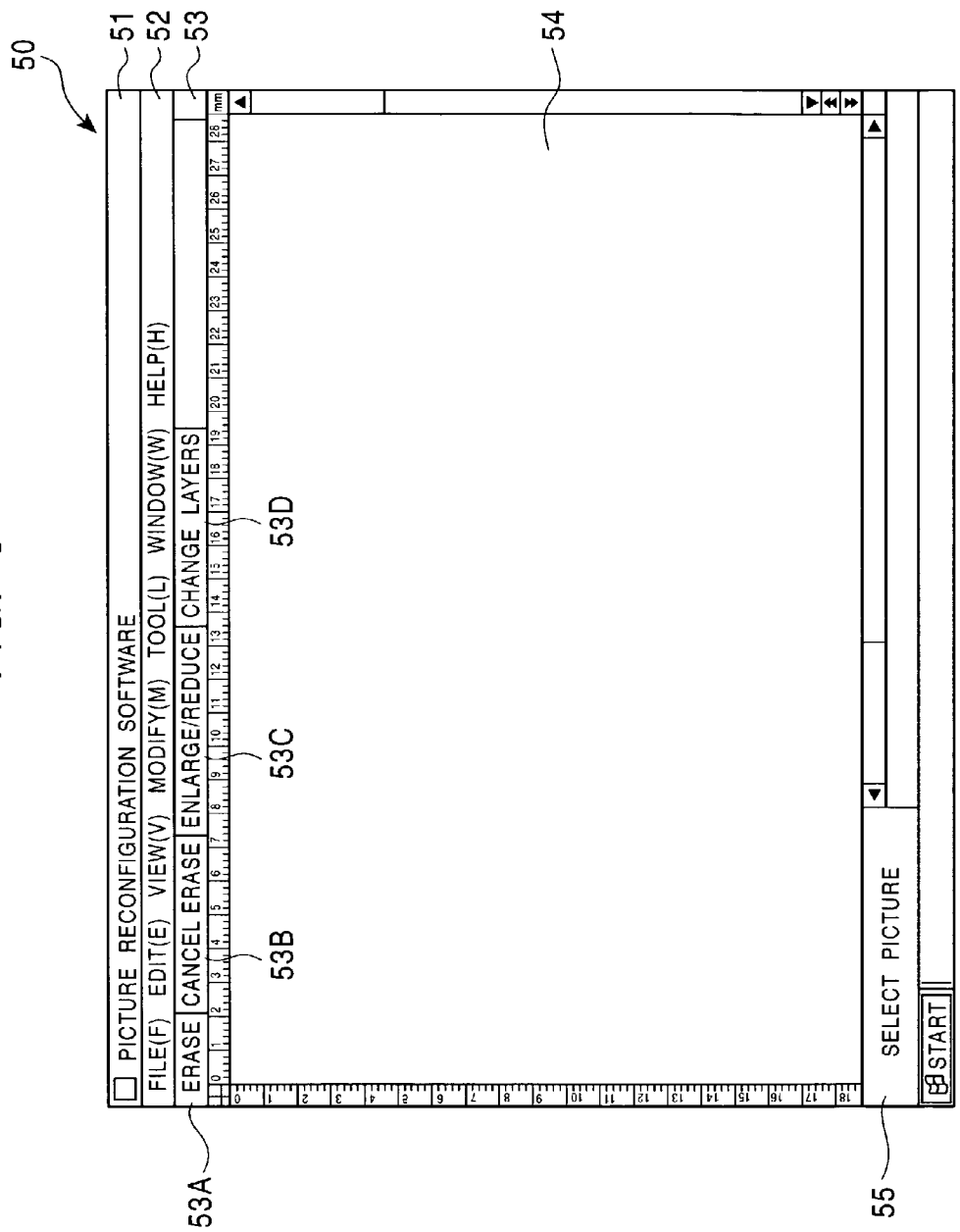
FIG. 8 is a schematic diagram showing an example of window screen according to the first embodiment.

More specifically, when a predetermined operation for requesting distribution of a motion picture is made via the mouse 21, the control unit 20 displays the motion picture on the display screen of the display unit 23, or loads a motion picture reconfiguration program for modifying the display configuration of the motion picture on display into the internal RAM, displaying a window screen 50 as shown in FIG. 8 on a desk-top screen of the display unit 23 via the display frame memory 22.

The window screen 50 includes, from a predetermined end to the other end, a title bar 51, a tool bar 52, a menu bar 53, and a display area 54 for displaying various pictures, in that order.

Figure 9:
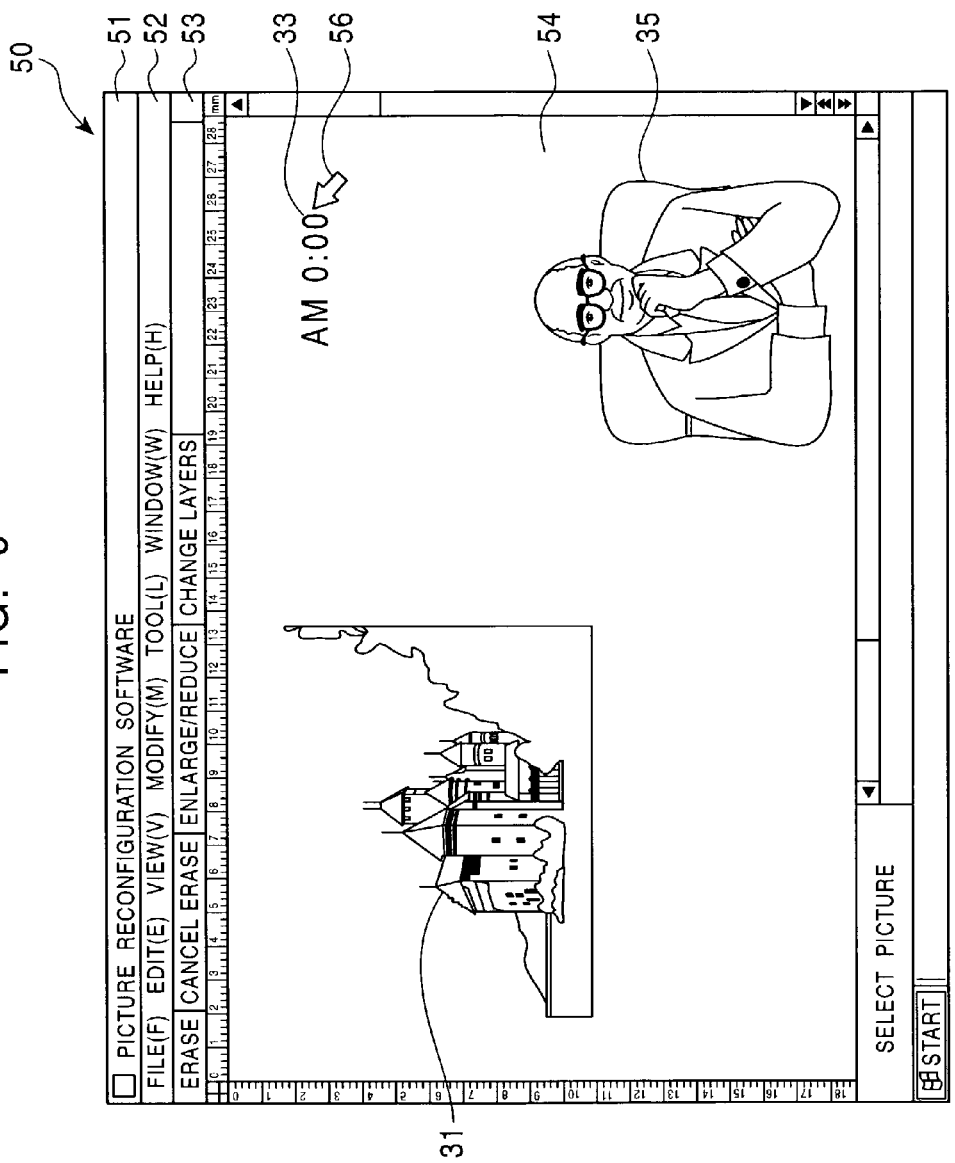
FIG. 9 is a schematic diagram showing a first example of display of objects in a display area.

In this example, the control unit 20 outputs the objects in the display frame memory 22 with the same display configuration as that of the frame picture (FIG. 3) prior to the extraction at the motion picture distribution server 2 on the distribution side, according to the display specification data D21, the center coordinate point and the reference point of each of the objects, and the picture size of each of the objects in the display specification information D25 written to the internal RAM, so that the scenery object 31 is displayed in the proximity of the top left corner of the display area 54 of the window screen 50, the telop object 33 in the proximity of the top right corner, and the person object 35 in the proximity of the bottom right corner, as shown in FIG. 9.

Furthermore, the control unit 20, upon receiving the display specification information D25 for each frame data set, newly forwarded from the display specification information decoding unit 28, updates the contents of the display specification information D25 written to the internal RAM with the contents of the new display specification information D25.

The control unit 20 repeatedly reads the person object data D11, the telop object data D8, and the scenery object data D5, in that order, from the individual frame memories 27C, 27B, and 27A, respectively, according to the updated display specification information D25, and stores them in the display frame memory 22. The control unit 20 then determines display configuration of the objects 31, 33, and 35 in the display frame memory 22 and outputs the result to the display unit 23.

Upon each time updating the contents of the display specification information D25 with new the display specification information D25 sequentially forwarded from the display specification information decoding unit 28, the control unit 20 determines display configuration of the scenery object 31, the telop object 33, and the person object 35 based on the scenery object data D5, the telop object data D8, and the person object data D11 in the display frame memory 22, respectively, according to the updated display specification information D25 and outputs the result to the display unit 23, so that the objects 31, 33, and 35 are displayed on the display area 54 of the window screen 50 on the display unit 23 in real time at the same positions and with the same shapes as those in the motion picture based on the motion picture data recorded in the HDD 6 of the motion picture distribution server 2 on the distribution side.

Figure 10:
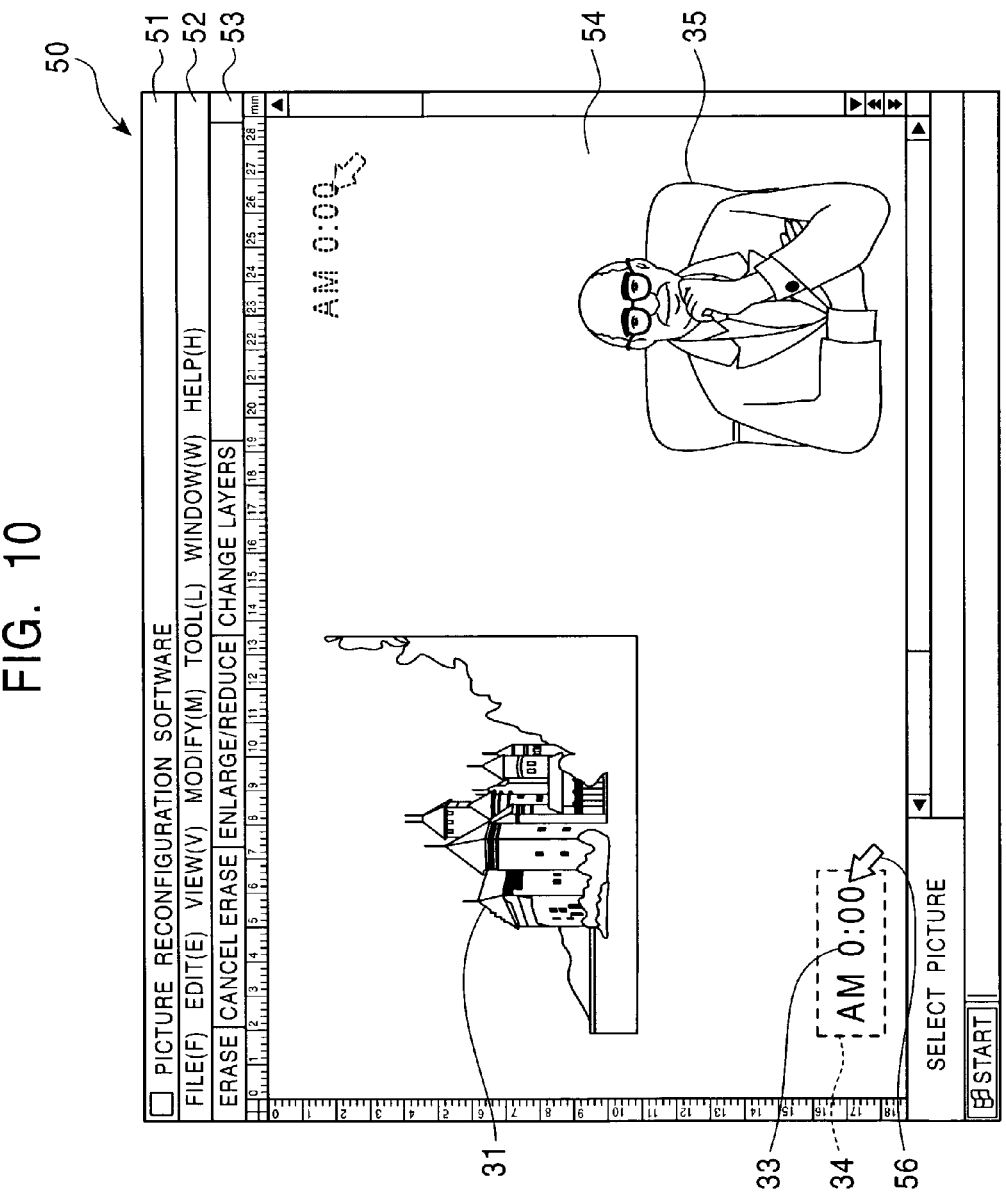
FIG. 10 is a schematic diagram showing a first example of modification of display configuration.

When, for example, the mouse 21 is pressed with a cursor 56 (FIG. 9) placed on the telop object 33, the cursor 56 is moved to the proximity of the bottom left corner with the mouse 21 pressed, and then the mouse 21 is unpressed, that is, when the telop object 33 is dragged, the control unit 20 moves the telop object 33 from the proximity of the top right corner of the window screen 50 to the proximity of the bottom left corner in accordance with the movement of the cursor 56, as shown in FIG. 10.

That is, when the mouse 21 is pressed, the control unit 20 sequentially detects objects associated with the relevant coordinate position from the uppermost layer to the lowermost layer, and determines that the telop object 33 is specified when the telop object 33 is detected.

The control unit 20 continues changing the reference point of the telop object 33 in the display specification information D25 in accordance with the distance and direction of the movement of the telop object 33. At this time, the control unit 20 outputs the telop object 33 to the display unit 23 while modifying the display configuration of the telop object 33 in the display frame memory 22 using the center coordinate point of the telop object 33 based on the modified reference point, so that the telop object 33 is displayed with movement in the display area 54 of the window screen 50.

Thus, the control unit 20 disregards movement inherent to the telop object 33 between adjacent frames while the telop object 33 is being moved by the mouse 21, and reflects the inherent movement of the telop object 33 between adjacent frames at the position in accordance with the distance and direction of the movement of the telop object 33 by the mouse 21.

Furthermore, when the mouse 21 is unpressed, the control unit 20 fixes the reference point to the current modified reference point so that the modified reference point will be maintained as the reference point of the telop object 33 for each subsequent display specification information D25 forwarded from the display specification information decoding unit 28 for each frame data set.

Thus, even if the telop object 33 is moved to the proximity of the bottom left corner of the window screen 50, the control unit 20 determines display configuration of the telop object 33 using the center coordinate point of the telop object 33 based on the modified reference point, so that the telop object 33 is displayed in real time at the correct position.

The menu bar 53 of the window screen 50 includes an erase item 53A for erasing an object displayed in the display area 54, a cancel erase item 53B for cancelling erasure of an erased object, an enlarge/reduce item 53C for enlarging or reducing an object, and a change layers item 53D for changing order of layers between objects.

Thus, when the mouse 21 (FIG. 7) is pressed with the cursor 56 placed at an arbitrary point and is then immediately unpressed, that is, when the mouse 21 is clicked, the control unit 20 becomes ready to accept selection of one of the items 53A to 53D on the menu bar 53.

Figure 11:
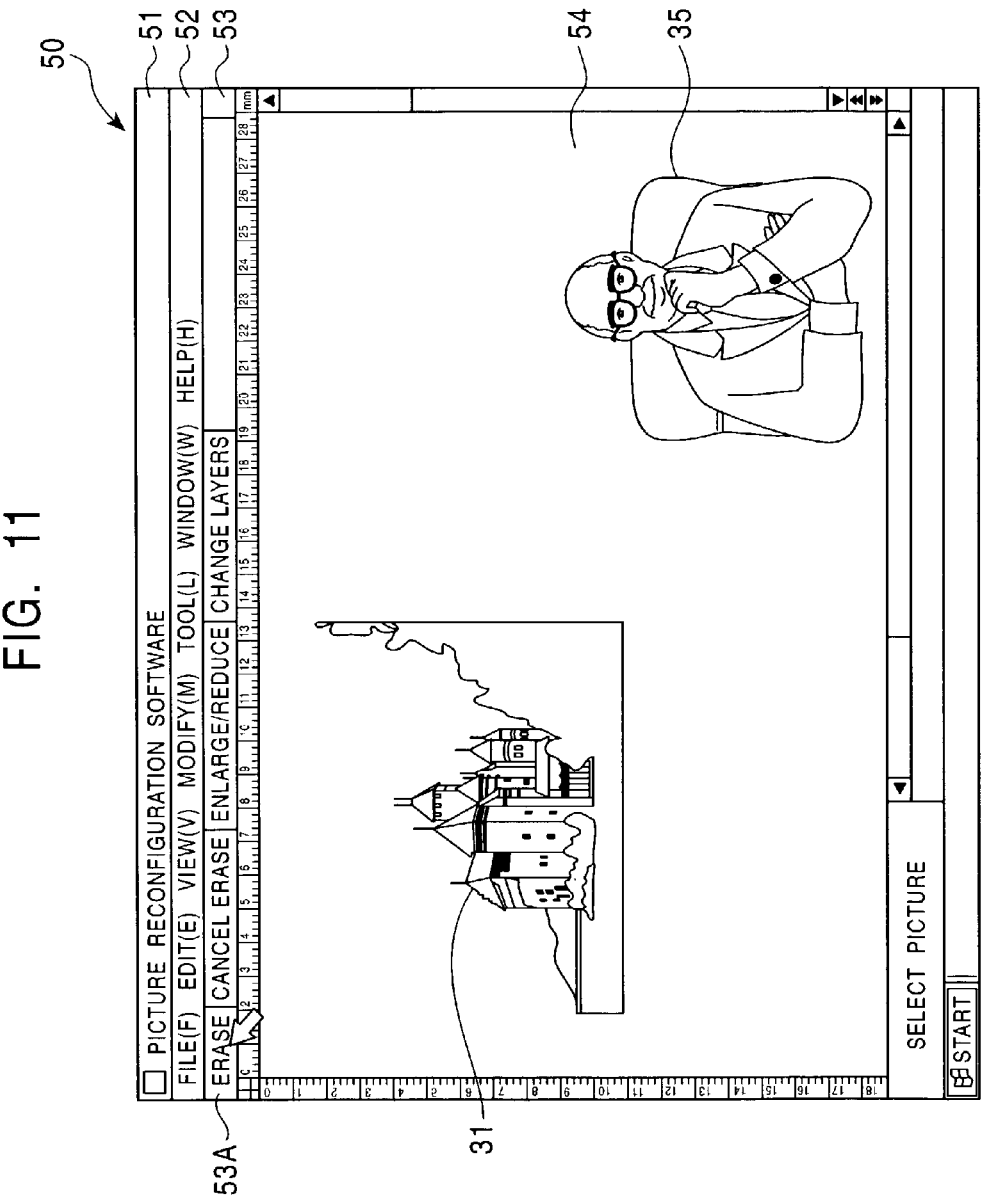
FIG. 11 is a schematic diagram showing a second example of modification of display configuration.

That is, subsequent to the state described above with reference to FIG. 10, when the mouse 21 is clicked with the cursor 56 placed on the telop object 33 and then on the erase item 53A on the menu bar 53, decoding process by the arbitrary shape decoding unit 26B (FIG. 7), from which the telop object 33 has been forwarded, is halted to stop forwarding of the telop object data D8 from the arbitrary shape decoding unit 26B to the display frame memory 22 via the individual frame memory 27B, whereby the telop object 33 is erased from the display area 54 of the window screen 50, as shown in FIG. 11.

Thus, the control unit 20 erases the telop object 33 in response to a request from a user operating the mouse 21, and also serves to minimize the overall power consumption of the personal computer 3.

When the telop object 33 is erased, the control unit 20 changes the display specification data D21 in the display specification information D25 written to the internal RAM to non-display setting only for the telop object 33, so that non-display setting is maintained for the telop object 33 in subsequent display specification information D25 forwarded from the display specification information decoding unit 28 for each frame data set.

Thus, even when the telop object 33 is erased from the window screen 50, the control unit 20 maintains the status of the telop object 33.

When the cancel erase item 53B on the menu bar 53 is clicked on, the control unit 20 resumes the decoding process by the arbitrary shape decoding unit 26B (FIG. 7) and changes the display specification of the telop object 33 in the display specification data D21 to display setting, and the display setting is maintained.

Figure 12:
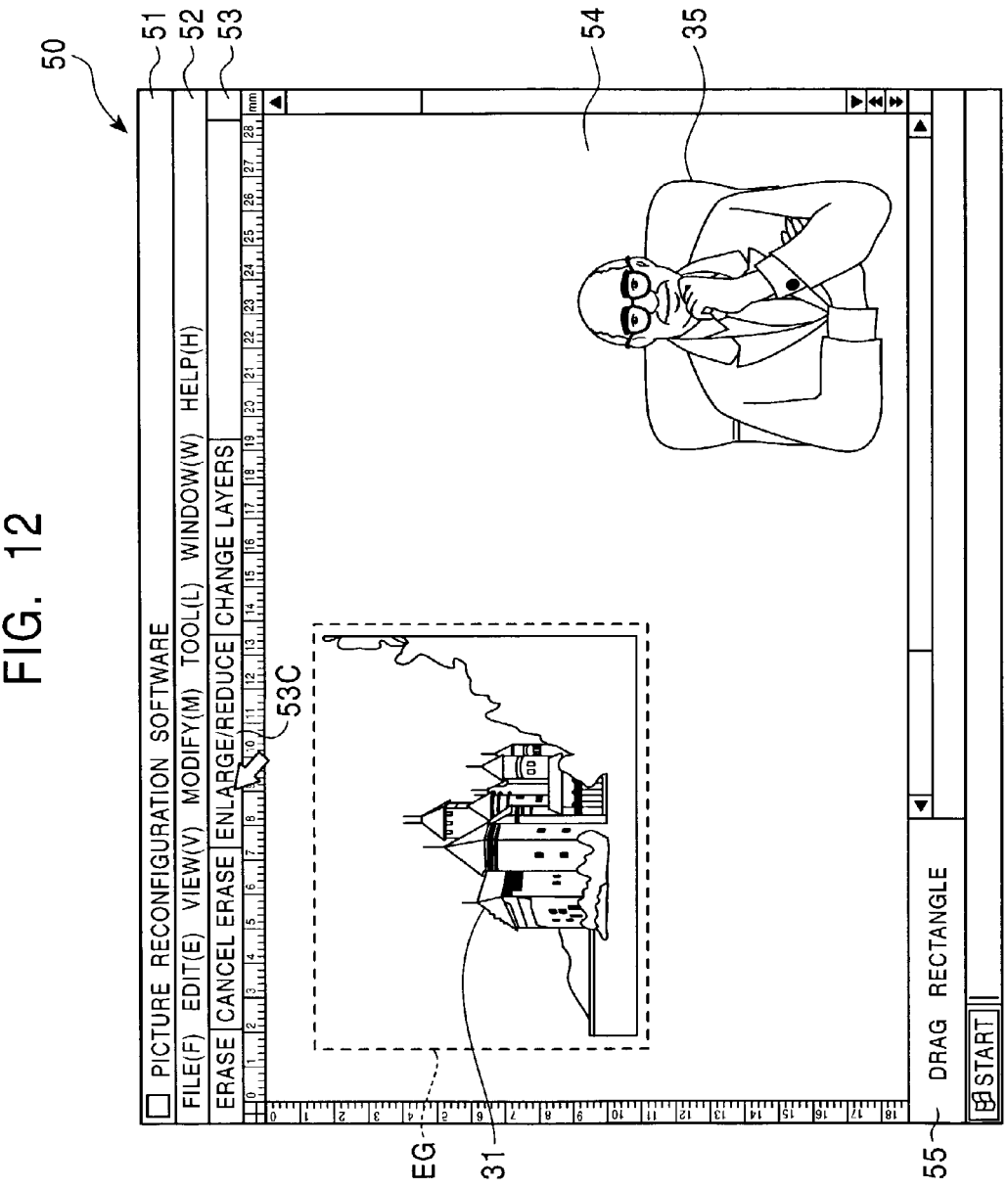
FIG. 12 is a schematic diagram showing a third example of modification of display configuration.

Furthermore, subsequent to the state described above with reference to FIG. 11, when the mouse 21 is clicked with the cursor 56 placed on the scenery object 31 and then on the enlarge/reduce item 53C, the control unit 20, as shown in FIG. 12, prompts the user with a message saying, for example, "drag corners" and displays an outer edge EG (the edge of the hatched area in FIG. 4, or the edge of the scenery tracking area 32 in FIG. 3), which is not displayed in the scenery object 31, in broken line.

Figure 13:
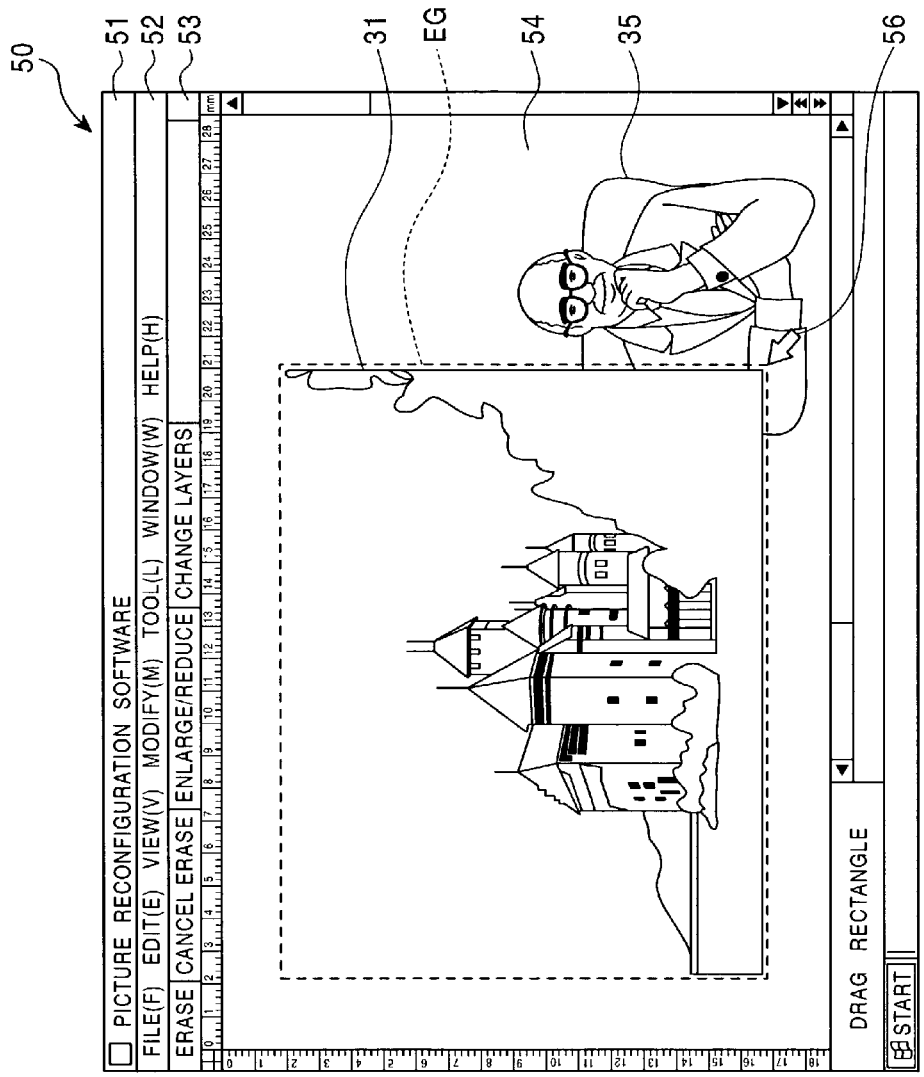
FIG. 13 is a schematic diagram showing a fourth example of modification of display configuration.

In this state, if, for example, the bottom right corner of the edge EG, shown in broken line, is dragged towards the bottom right of the display area 54 of the window screen 50, the control unit 20 enlarges the scenery object 31 in the edge EG, shown in broken line, in accordance with the movement, as shown in FIG. 13.

That is, the control unit 20 continues modifying the picture size of the scenery object 31 in the display specification information D25 in accordance with the distance and direction of the movement of the scenery object 31. At this time, the control unit 20 reads the scenery object data D5 from the individual frame memory 27A and stores it in the display frame memory 22 while sequentially interpolating the scenery object data D5 according to the modified picture size without changing the aspect ratio. The control unit 20 then outputs the scenery object 31 based on the interpolated scenery object data D5 (FIG. 7) to the display unit 23, displaying the enlarged scenery object 31 in the display area 54 of the window screen 50.

Furthermore, when the mouse 21 is unpressed, the control unit 20 fixes the picture size to the current modified picture size so that the picture size of the scenery object 33 is maintained to the modified picture size for each subsequent display specification information D25 forwarded from the display specification information decoding unit 28 for each frame data set.

Thus, when the scenery object 31 is enlarged, the control unit 20 displays the scenery object 31 in real time in the enlarged size.

On the other hand, when the user is prompted with a message saying, for example, "drag corners" in the instruction item 55 with the edge EG displayed in broken line, for example, if the bottom right corner of the edge EG is dragged towards the top left of the display area 54 of the window screen 50, the control unit 20 reduces the scenery object 31 in the edge EG, shown in broken line, in accordance with the movement.

Figure 14:
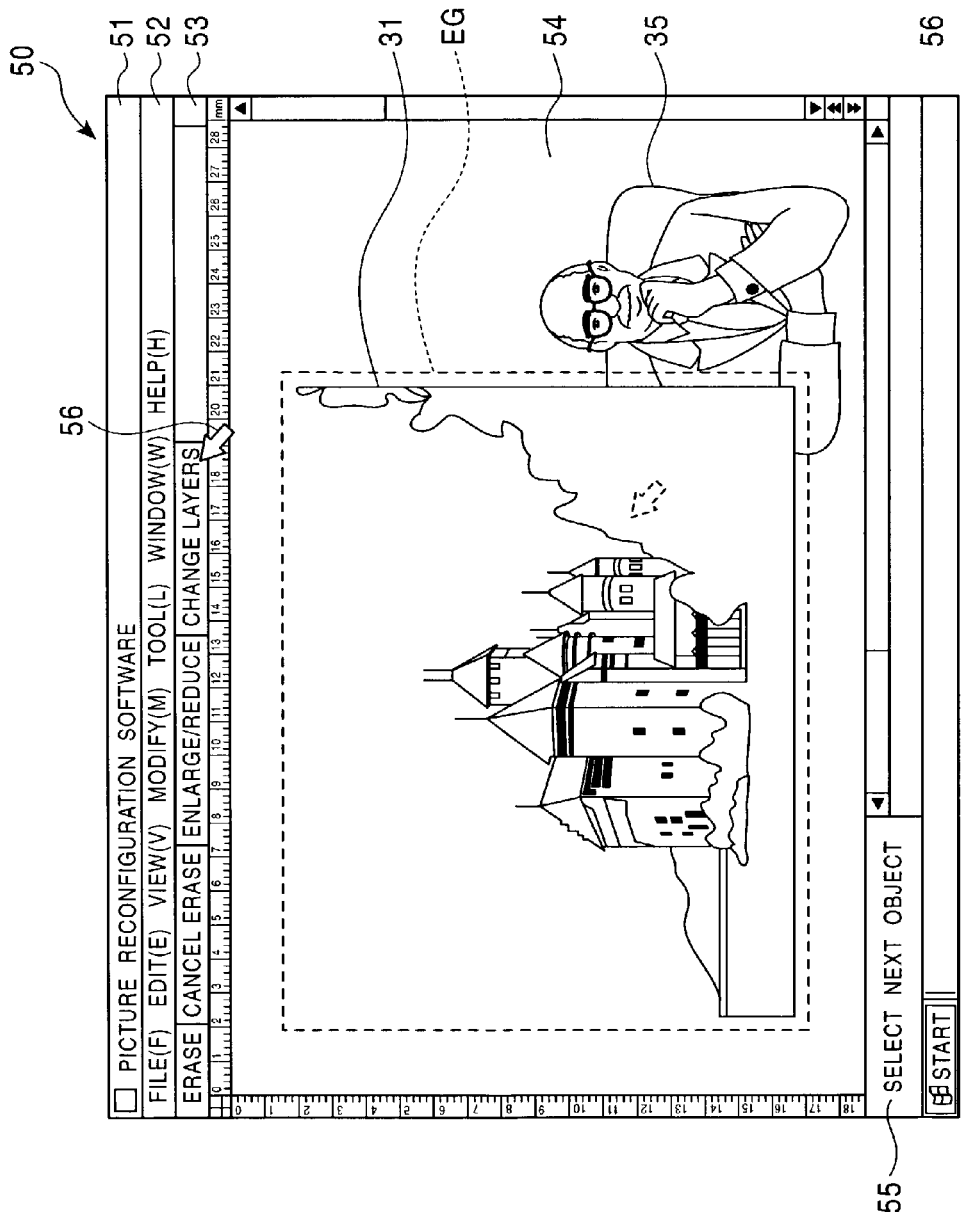
FIG. 14 is a schematic diagram showing a fifth example of modification of display configuration.

Furthermore, subsequent to the state described above with reference to FIG. 13, for example, if the mouse 21 is clicked with the cursor 56 placed on the scenery object 31 and then on the change layers item 53D on the menu bar 53, the control unit 20, as shown in FIG. 14, prompts the user with a message saying, for example, "select next object" and displays the outer edge EG, not displayed in the scenery object 31, in broken line.

Figure 15:
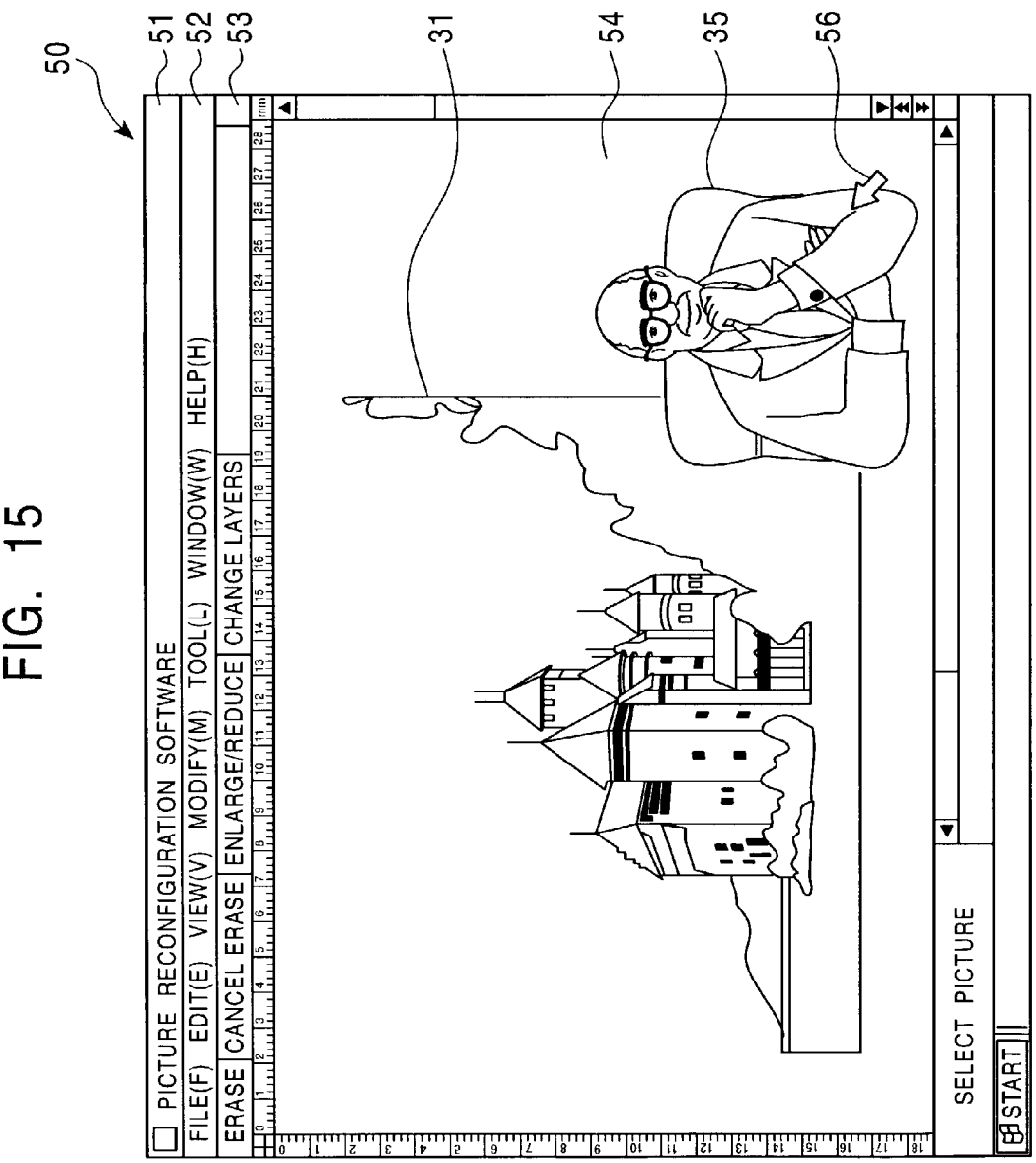
FIG. 15 is a schematic diagram showing a sixth example of modification of display configuration.

In this state, when, for example, the mouse 21 is clicked with the cursor 56 placed on the person object 35, the control unit 20 reverses the order of layers between the scenery object 31 and the person object 35, as shown in FIG. 15.

That is, with regard to the scenery object 31 on the uppermost layer, the telop object 33 on the intermediate layer, and the person object 35 on the lowermost layer, specified in advance by the layer order specification data D22 in the display specification information D25, the control unit 20 changes layers so that the scenery object 31 is now on the lowermost layer and the person object on the uppermost layer, maintaining the modified layer order for the layer order specification data D22 in each subsequent display specification information D25 forwarded from the display specification information decoding unit 28 for each frame data set.

Thus, the control unit 20 repeatedly reads the scenery object data D5, the telop object data D8, and the person object data D11, in that order, from the individual frame memories 27A, 27B, and 27C, respectively, according to the modified layer order specification data D22, storing them in the display frame memory 22.

The control unit 20 then determines display configuration for the person object 35, the telop object 33, and the scenery object 31 in the display frame memory 22 and outputs the result, whereby the person object 35 is displayed on the uppermost layer on the display unit 23.

As described above, the control unit 20 modifies the display specification information D25 according to various operations of the mouse 21, controlling the individual frame memories 27A, 27B, and 27C and the display frame memory 22 according to the modified display specification information D25, so that display configuration of the objects 31, 33, and 35 on the display area 54 of the window screen 50 can be modified.

1.5 Procedure of Display Status Modifying Process

Figure 16:
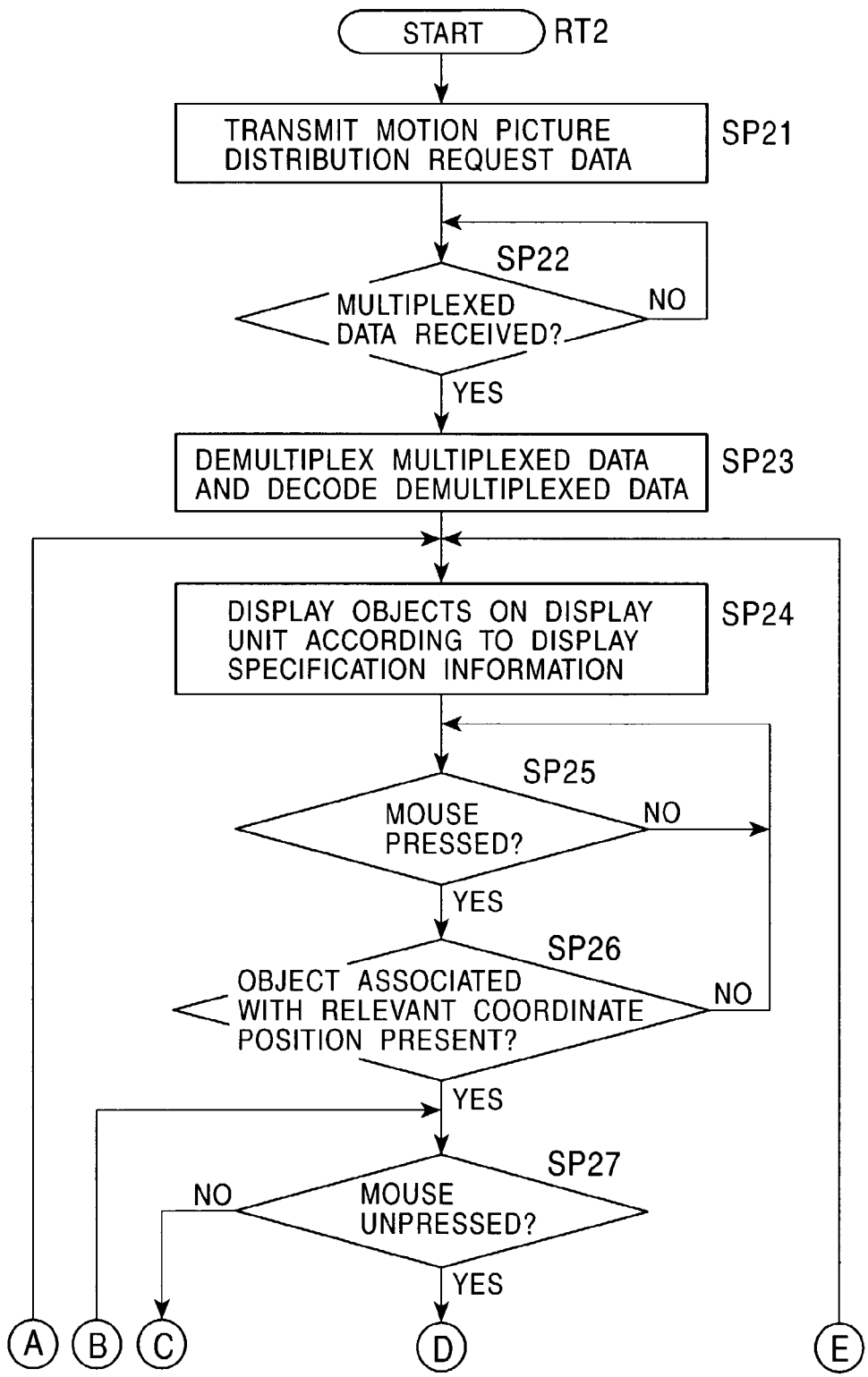
FIG. 16 is a flowchart showing the procedure of a display process (A)

The procedure of the display status modifying process will be summarized below. Referring to FIG. 16, upon starting a routine RT2, the personal computer 3 enters step S21.

In step SP21, the personal computer 3 transmits to the motion picture distribution server 2 motion picture distribution request data Dre generated in response to a predetermined operation of the mouse 21 for requesting distribution of a motion picture, and then proceeds to step SP22.

In step SP22, the personal computer 3 determines whether the multiplexed data D13 distributed from the motion picture distribution server 2 has been received. If the test turns out negative, the personal computer 3 waits until the multiplexed data D13 is received.

On the other hand, if the test turns out positive, the personal computer 3 proceeds to step SP23.

In step SP23, the personal computer 3 demultiplexes the multiplexed data D13 into the encoded data D6, D9, and D12 (FIG. 7) and the encoded display specification data D26, decodes them to restore the object data D5, D8, and D11, and the display specification information D25, respectively, and then proceeds to step S24.

In step SP24, the personal computer 3 determines display configuration of the objects 31, 33, and 35 based on the object data D5, D8, and D11, respectively, according to the display specification information D25, displays the objects 31, 33, and 35 on the display unit 23 (FIG. 9), and then proceeds to step SP25.

In step SP25, the personal computer 3 determines whether the mouse 21 has been pressed. If the test turns out negative, indicating that the user watching the display unit 23 does not want to modify the display configuration of any of the objects 31, 33, and 35, the personal computer 3 returns to step SP24, continuing determination of display configuration according to the display specification information D25 and displaying the objects 31, 33, and 35 on the display unit 23.

On the other hand, if the test turns out positive, indicating that the user watching the display unit 23 wants to modify the display configuration of the objects 31, 33, and 35 and that one of the objects 31, 33, and 35 has been selected, the personal computer 3 proceeds to step SP26.

In step SP26, the personal computer 3 determines whether an object associated with the position at which the mouse 21 has been pressed is present. If the test turns out negative, indicating none of the objects is present at the position at which the mouse 21 has been pressed, the personal computer 3 returns to step SP25.

On the other hand, if the test turns out positive, indicating that an object is present at the position at which the mouse 21 has been pressed and that the object has been selected, the personal computer 3 proceeds to step SP27.

Figure 17:
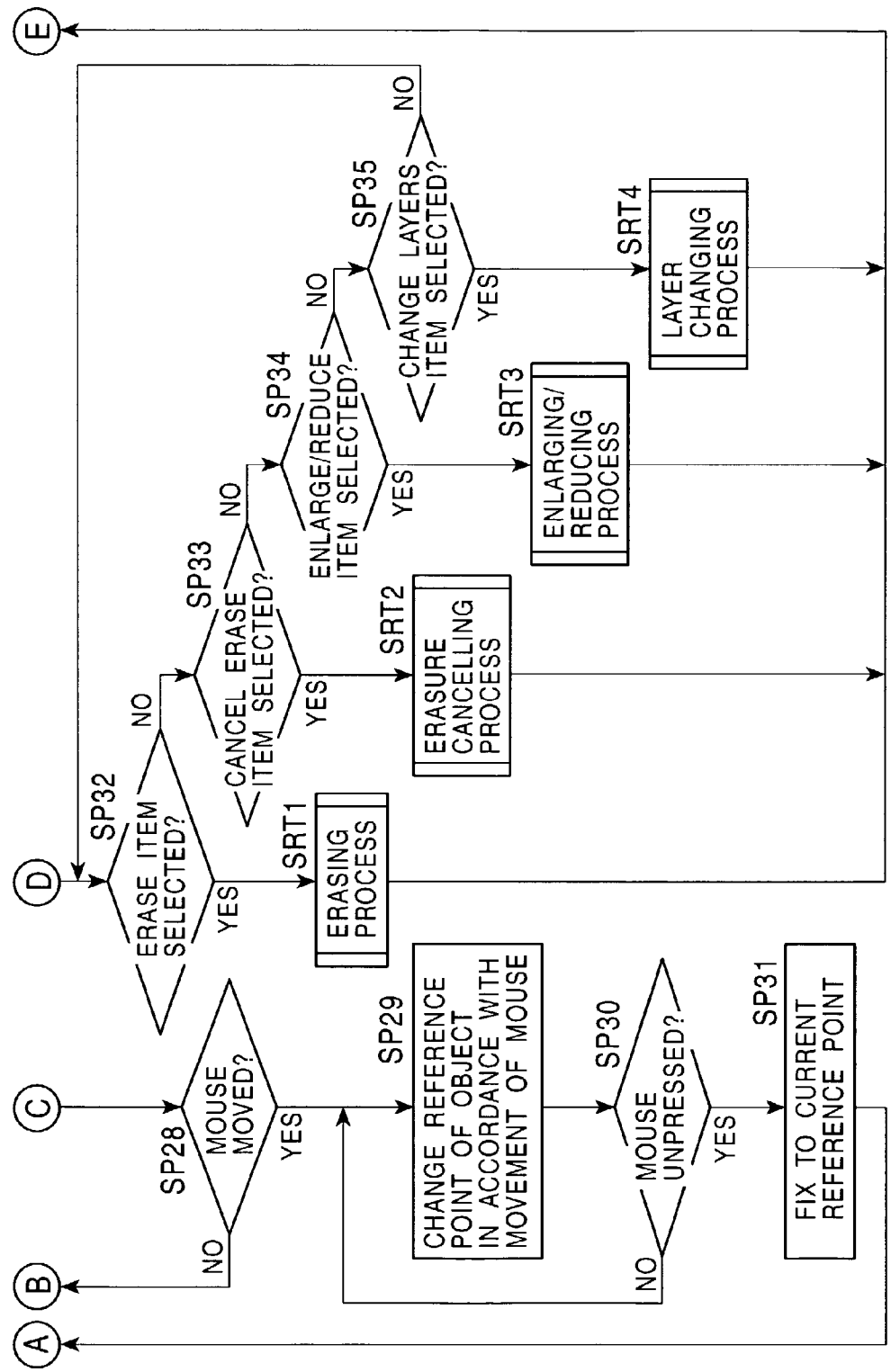
FIG. 17 is a flowchart showing the procedure of a display process (B)

In step SP27, the personal computer 3 determines whether the mouse 21 has been unpressed. If the test turns out negative, the personal computer 3 proceeds to step SP28 (FIG. 17).

In step SP28, the personal computer 3 determines whether the mouse 21 has been moved. If the test turns out negative, the personal computer 3 returns to step SP27 (FIG. 16), and waits until the mouse 21 is moved.

On the other hand, if the test turns out positive, indicating that the mouse is kept pressed being moved, the personal computer 3 proceeds to step SP29.

In step SP29, the personal computer 3 modifies the reference point of the selected object in the display specification information D25 in accordance with the distance and direction of the movement of the mouse 21, and then proceeds to step SP30.

In step SP30, the personal computer 3 determines whether the mouse 21 has been unpressed. If the test turns out negative, the personal computer 3 continues changing the reference point of the selected object in the display specification information D25 in accordance with the distance and direction of the movement of the mouse 21 until the mouse 21 is unpressed.

On the other hand, if the test turns out positive, the personal computer 3 proceeds to step SP31.

In step SP31, the personal computer 3 fixes the reference point of the selected object in the display specification information D25 to the reference point at the time when the mouse 21 is unpressed. The personal computer 3 then returns to step SP24 (FIG. 16) and determines display configuration of the selected object based on the fixed reference point and using the center coordinate point of the selected object (FIG. 10).

If the test in step SP27 (FIG. 16) turns out positive, indicating that an operation associated with one of the items 53A to 53D on the menu bar 53 (FIG. 8) is to be executed on the selected object, the personal computer 3 proceeds to step SP32 (FIG. 17).

Figure 18:
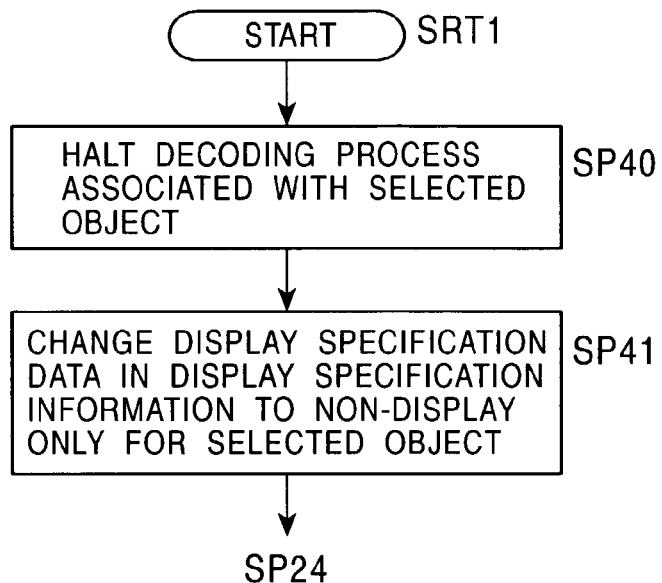
FIG. 18 is a flowchart showing the procedure of an erasing process.

In step SP32, the personal computer 3 determines whether the erase item 53A has been clicked on. If the test turns out positive, the personal computer 3 enters a subroutine SRT1 shown in FIG. 18 to execute an erasing process.

Upon starting the subroutine SRT1, the personal computer enters step SP40.

In step SP40, the personal computer 3 halts decoding process for encoded data associated with the object selected in step SP26 (FIG. 16), erasing the selected object (FIG. 11), and then proceeds to step SP41.

In step SP41, the personal computer 3 modifies the display specification data D21 in the display specification information D25 to non-display setting only for the selected object. The personal computer 3 then returns to step SP24 (FIG. 16) and continues determination of display configuration according to the modified display specification information D25.

If the test in step SP32 turns out negative, indicating that erasure of the selected object is not desired, the personal computer 3 proceeds to step SP33.

Figure 19:
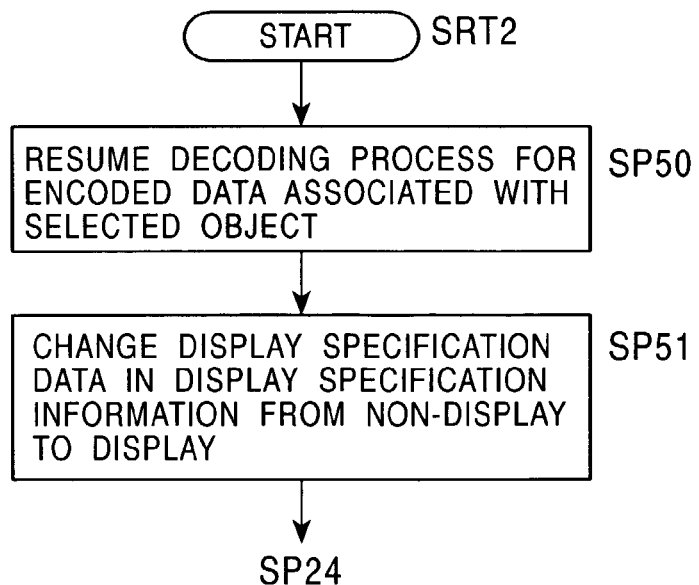
FIG. 19 is a flowchart showing the procedure of an erasure cancelling process.

In step SP33, the personal computer 3 determines whether the cancel erase item 53B has been clicked on. If the test turns out positive, indicating that the selected object has been erased before and that erasure of the selected object is now desired to be cancelled, the personal computer 3 enters a subroutine SRT2 shown in FIG. 19 to execute an erasure cancelling process.

Upon starting the subroutine SRT2, the personal computer 3 enters step SP50.

In step SP50, the personal computer 3 resumes the decoding process for the encoded data associated with the object selected in step SP26 (FIG. 16), and then proceeds to step SP51.

In step SP51, the personal computer 3 modifies the display specification data D21 of the selected object in the display specification information D25 from non-display setting to display setting. The personal computer 3 then returns to step SP24 (FIG. 16) and continues determination of display configuration according to the modified display specification information D25.

If the test in step SP33 turns out negative, indicating that cancelling of erasure of the selected object is not desired, the personal computer 3 proceeds to step SP34.

Figure 20:
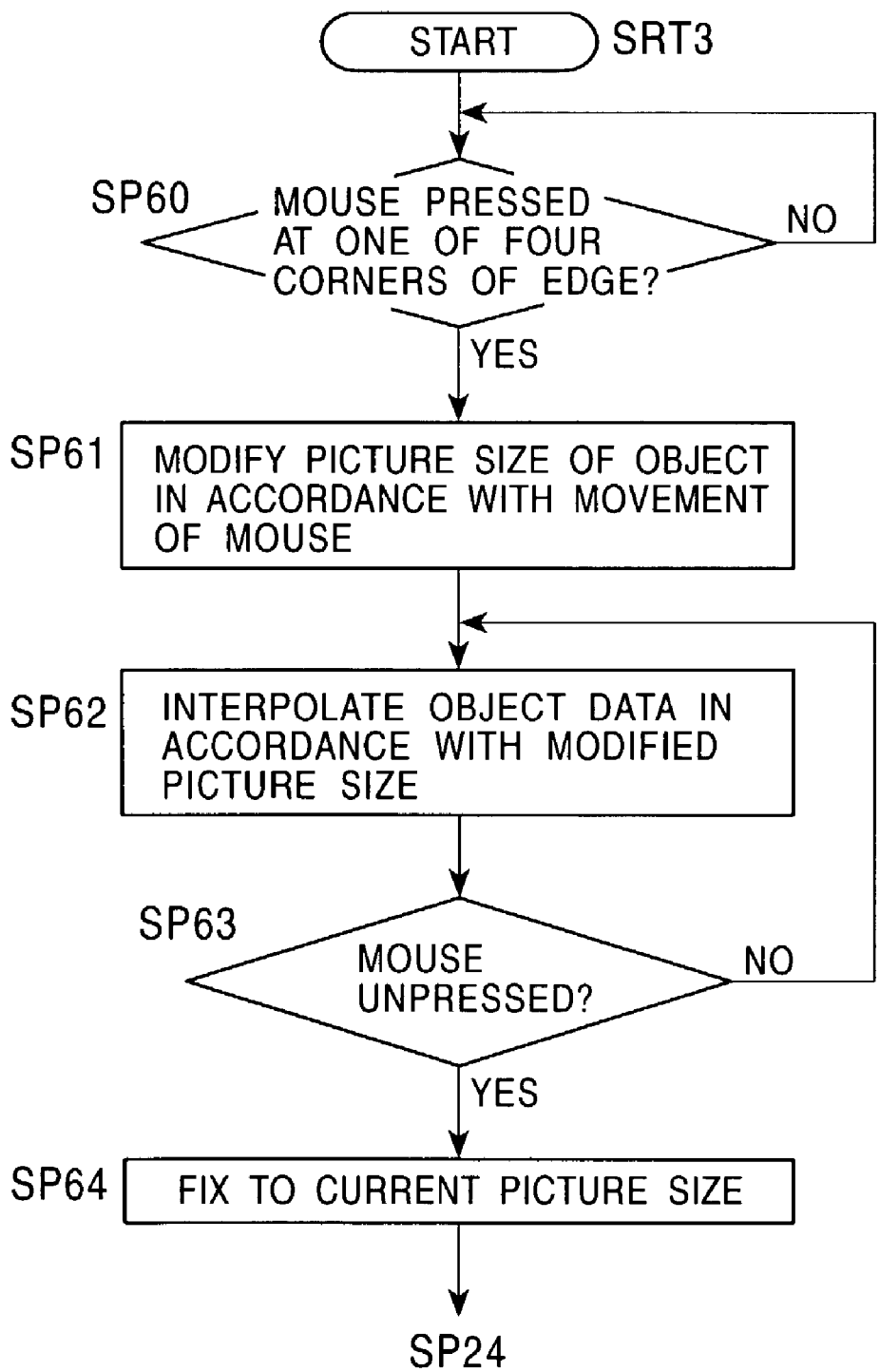
FIG. 20 is a flowchart showing the procedure of an enlarging/reducing process.

In step SP34, the personal computer 3 determines whether the enlarge/reduce item 53C has been clicked on. If the test turns out positive, the personal computer 3 enters a subroutine SRT3 shown in FIG. 20 to execute an enlarging/reducing process.

Upon starting the subroutine SRT3, the personal computer 3 enters step SP60.

In step SP60, the personal computer 3 determines whether the mouse 21 has been pressed at one of the four corners of the edge EG (FIG. 12) including the selected object. If the test turns out negative, the personal computer 3 waits until the mouse 21 is pressed at one of the four corners of the edge EG including the selected object.

On the other hand, if the test turns out positive, the personal computer 3 proceeds to step SP61.

In step SP61, the personal computer 3 modifies the picture size of the selected object in the picture size of the display specification information D25 in accordance with the distance and direction of the movement of the mouse 21 (FIG. 13), and then proceeds to step SP62.

In step SP62, the personal computer 3 interpolates object data of the selected object in accordance with the modified picture size, and then proceeds to step SP63.

In step SP63, the personal computer 3 determines whether the mouse 21 has been unpressed. If the test turns out negative, the personal computer 3 returns to step SP62 and modifies the picture size of the selected object in accordance with the distance and direction of the movement of the mouse 21.

On the other hand, if the test turns out positive, indicating that the enlarging or reducing operation for the selected object via the mouse 21 has been finished, the personal computer 3 proceeds to step SP64.

In step SP64, the personal computer 3 fixes the picture size to the picture size at the time when the mouse 21 is unpressed. The personal computer 3 then returns to step SP24 (FIG. 16) and continues determination of display configuration according to the fixed display specification information D25.

If the test in step SP34 turns out negative, indicating that enlarging/reducing of the selected object is not desired, the personal computer 3 proceeds to step SP35.

Figure 21:
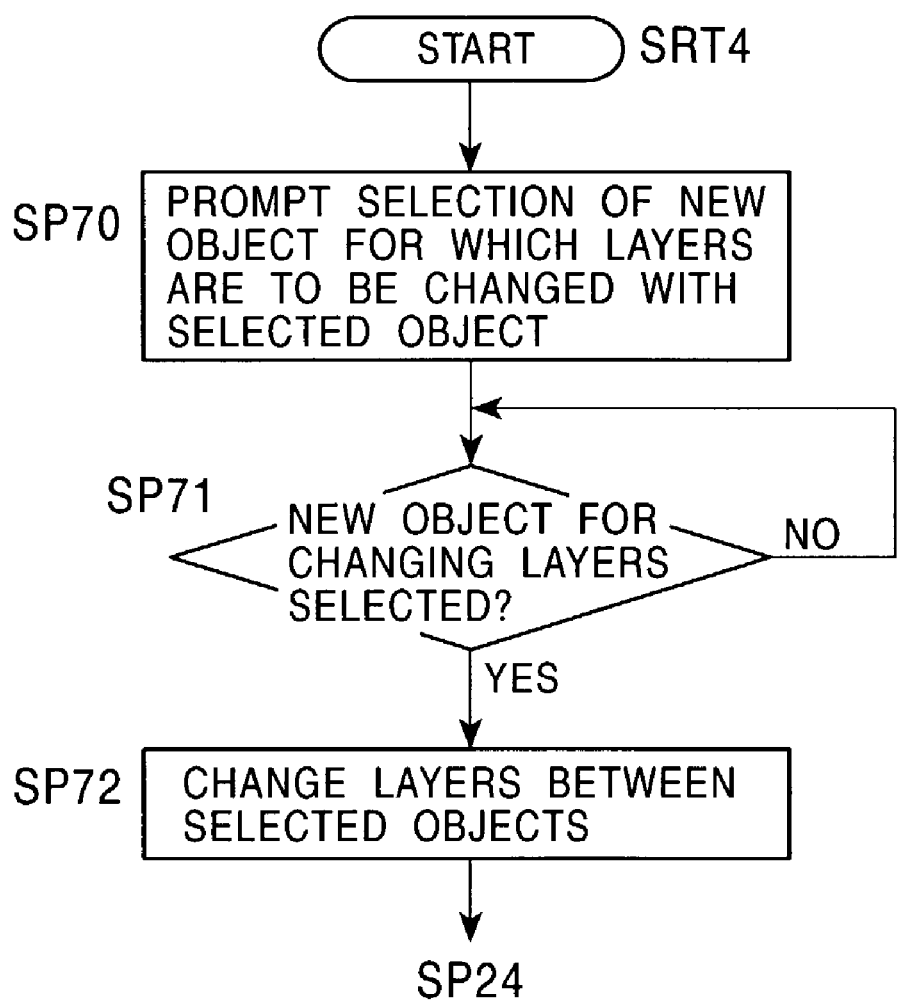
FIG. 21 is a flowchart showing the procedure of a layer changing process.

In step SP35, the personal computer 3 determines whether the change layers item 53D has been clicked on. If the test turns out positive, the personal computer 3 enters a subroutine SRT4 shown in FIG. 21 to execute a layer changing process.

Upon starting the subroutine SRT4, the personal computer 3 enters step SP70.

In step SP70, the personal computer 3 prompts the user to select a new object for which layers are to be changed with the selected object (FIG. 14), and then proceeds to step SP71.

In step SP71, the personal computer 3 determines whether a new object for which layer is to be changed has been selected. If the test turns out negative, the personal computer 3 waits until a new object is selected.

On the other hand, if the test turns out positive, the personal computer 3 proceeds to step SP72.

In step SP72, the personal computer 3 changes layers in the layer order specification data D22 between the object selected in step SP26 (FIG. 16) and the new object selected in step SP71 (FIG. 15). The personal computer 3 then returns to step SP24 (FIG. 16) and continues determination of display configuration according to the modified display specification information D25.

If the test in step SP35 turns out negative, indicating that none of the items 53A to 53D on the menu bar 53 has been selected, the personal computer 3 loops through steps SP32, SP33, SP34, and SP35 until one of the items 53A to 53D is clicked on.

As described above, the personal computer 3 sequentially decodes the encoded display specification data D26 distributed separately from the encoded data D6, D9, and D12, displays the scenery object 31, the telop object 33, and the person object 35 based on the object data D5, D8, and D11, respectively, in a display configuration determined according to the display specification information D25 thus obtained, and when various operations are executed via the mouse 21, the personal computer 3 modifies the display specification information D25 in accordance with the operation of the mouse 21, displaying the objects 31, 33, and 35 in a display configuration determined according to the modified display specification information D25.

1.6 Operation and Advantages

According to the motion picture distribution system described above, the motion picture distribution server 2 tracks the tracking areas 32, 34, 36 respectively by the object processing units CP1 to CP3 that constitute object processing means, and distributes the extracted objects 31, 33, and 35, and the display specification information D25 specifying display status of the objects 31, 33, and 35, generated for each frame data set by the display specification information generation unit 13 that constitutes display specification information generation means, from the distribution side transmission/reception unit 12 that constitutes transmission means to the personal computer 3 via the Internet 4.

The personal computer 3 receives the objects 31, 33, and 35, and the display specification information D25 via the Internet 4 by the reception side transmission/reception unit 24 that constitutes reception means, and determines display configuration according to the display specification information D25 by the display control unit 29 that constitute display control means, achieving the same display status on the display unit 23 that constitute display means as the frame pictures (FIG. 3) prior to extraction at the motion picture distribution server 2.

When a modifying operation is made via the mouse 21 that constitutes input means on the objects 31, 33, and 35 displayed in the same display status as the frame pictures (FIG. 3) prior to extraction at the motion picture distribution server 2, the personal computer 3 modifies the center coordinate point and the reference point of each of the objects, the picture size of each of the objects, the display specification data D21, and the layer order specification data D22, that constitute contents of the display specification information D25, by the control unit 20 that constitutes specification content modification means, in accordance with the modifying operation of the mouse 21.

Thus, according to the motion picture distribution system 1, the objects 31, 33, and 35 can be provided with intention of the user operating the mouse 21 reflected thereon.

In this case, the personal computer 3 uses the center coordinate point and the reference point of each of the objects, the picture size of each of the objects, the display specification data D21, and the layer order specification data D22 as the contents of display specification, so that the objects 31, 33, and 35 displayed on the display unit 23 can be displayed in different layer order, moved to different positions, enlarged or reduced, and can be erased.

Thus, the personal computer 3 is allowed to perform simple processing on the objects 31, 33, and 35 displayed in real time without using a large-scale apparatus such as an editing apparatus.

According to the motion picture distribution system described above, the objects 31, 33, and 35, and the display specification information D25 generated by the motion picture distribution server 2 are distributed to the personal computer 3, and the personal computer 3 displays the objects 31, 33, and 35 in display configuration determined according to the display specification information D25 and modifies specification contents of the display specification information D25 in accordance with modifying operations via the mouse 21, so that intention of the user operating the mouse 21 can be reflected on the objects 31, 33, and 35, serving to popularize distribution of picture.

Although the first embodiment has been described in relation to a case where motion picture data MD is read from the HDD 6 by the unit of each subject frame data D1 to detect motion vector, the present invention is not limited thereto, and motion vector may be sequentially detected for each subject frame data of motion picture data acquired by imaging a target with a video camera.

Furthermore, although the first embodiment has been described in relation to a case where the control unit 20 of the personal computer 3 determines display configuration of the objects 31, 33, and 35 according to the display specification information D25 transmitted from the motion picture distribution server 2, the present invention is not limited thereto, and the control unit 20 of the personal computer 3 may determine display configuration according to prestored display specification information.

Furthermore, although the first embodiment has been described in relation to a case where the motion picture distribution server 2 multiplexes and distributes the encoded data D6, D9, and D12, and the encoded display specification data D26, the present invention is not limited thereto, and the encoded data D6, D9, and D12, and the encoded display specification data D26 may be distributed separately.

Furthermore, although the first embodiment has been described in relation to a case where the display specification information D25 is generated for each frame data set of 60 frames, the present invention is not limited thereto, and the display specification information D25 may be generated for each frame data set of arbitrary number of frames, for example, 20 frames or 37 frames.

Furthermore, although the first embodiment has been described in relation to a case where the personal computer 3 is used as a display status modifying apparatus, the present invention is not limited thereto, and may also be applied to various display status modifying apparatuses in the form of, for example, PDAs (Personal Digital Assistants) or cellular phones.

In this case, the display status modifying apparatuses halt the decoding process by the arbitrary shape decoding units 26A to 26C from which the objects 31, 33, and 35 originate, as specified by the mouse 21. Thus, by selectively erasing the objects 31, 33, and 35 in accordance with available processing capability, usability of the display status modifying apparatuses can be improved.

2. Second Embodiment 2.1 Overall Construction

Figure 22:
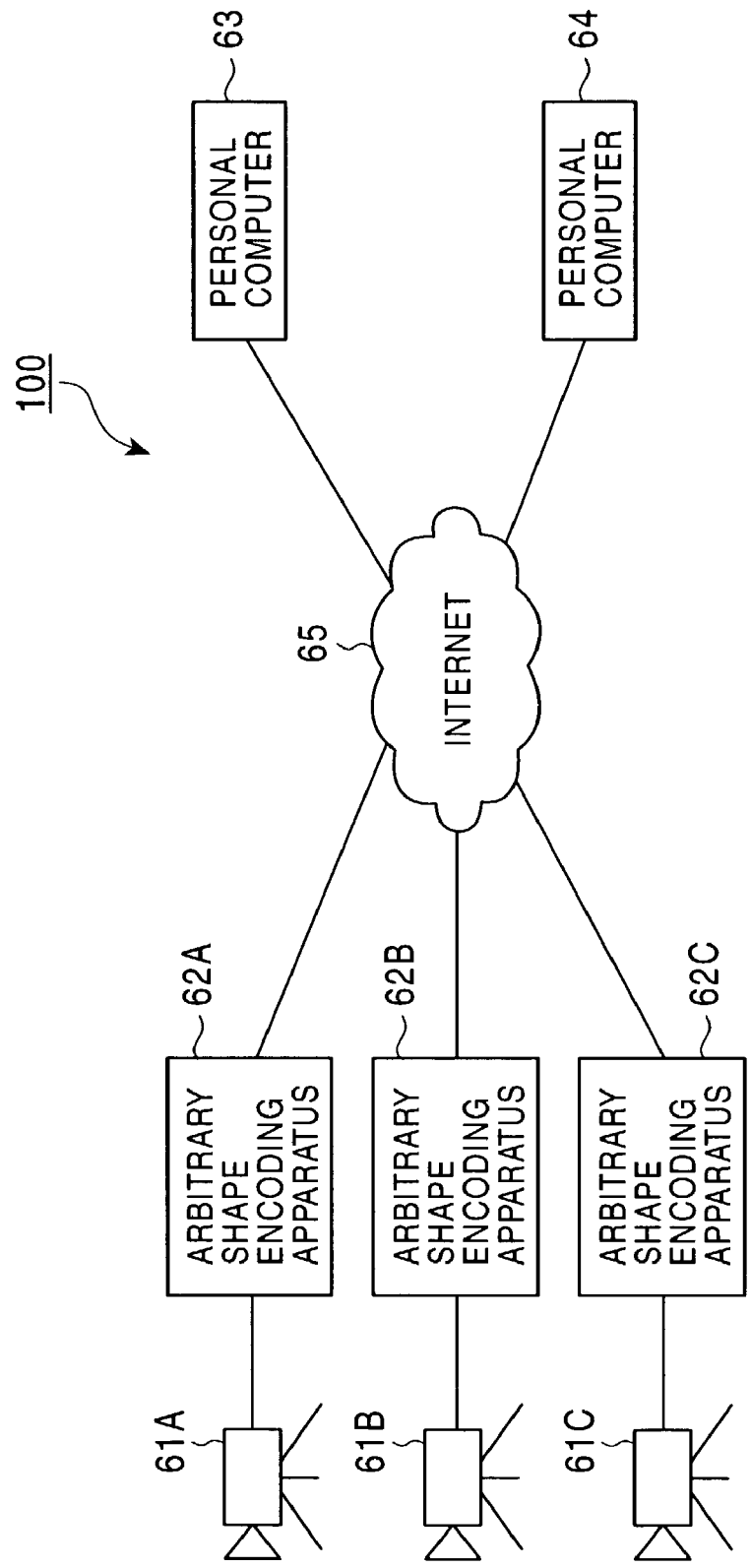
FIG. 22 is a block diagram showing the overall construction of a motion picture distribution system according to a second embodiment of the present invention.

Referring to FIG. 22, a motion picture providing system 100 according to a second embodiment of the present invention is constructed by linking arbitrary shape encoding apparatuses 62A, 62B, and 62C, with personal computers 63 and 64 via the Internet 65.

The arbitrary shape encoding apparatus 62A tracks a tracking area in frame pictures based on frame data constituting motion picture data acquired by imaging a target with a video camera 61A, and sequentially compresses and encodes each object data of an object extracted from the tracking area to generate encoded data, transmitting it to the personal computer 63.

Similarly to the arbitrary shape encoding apparatus 62A, the arbitrary shape encoding apparatuses 62B and 62C track tracking areas in frame pictures based on frame data constituting motion picture data acquired by imaging targets by video cameras 61B and 61C, and sequentially compress and encode each object data of objects extracted from the tracking areas to generate encoded data, respectively, transmitting them to the personal computer 63.

The personal computer 63 sequentially decodes the encoded data transmitted from the arbitrary shape encoding apparatuses 62A, 62B, and 62C, and displays objects based on the decoded object data in real time. Furthermore, the personal computer 63 re-encodes the objects as required to generate encoded data, transmitting them to the personal computer 64.

2.2. Construction of Arbitrary Shape Encoding Apparatuses

The arbitrary shape encoding apparatuses 62A, 62B, and 62C are constructed identically to each other, and thus only the construction of the arbitrary shape encoding apparatus 62A will be described herein.

Referring to FIG. 23, a motion vector detection unit 70 of the arbitrary shape encoding apparatus 62A, upon receiving motion picture distribution request data Dre1 transmitted from the personal computer 63, divides each frame data of motion picture data MD1 supplied from the video camera 61A into a plurality of macro blocks, generating divided frame data D30.

The motion vector detection unit 70 reads, for example, frame data temporally preceding the divided frame data as reference frame data, and detects motion vector data D31 of each of the macro blocks by block matching using the divided frame data D30 and the reference frame data, forwarding the motion vector data D31 and the divided frame data D30 to an object processing unit CP4 that constitutes object processing means.

In this embodiment, similarly to the example described earlier with reference to FIG. 3, in a motion tracking unit 71 of the object processing unit CP4, a person tracking area 36 including a person object 35 in the proximity of the bottom right corner of the frame picture 30 based on frame data is specified in advance by tracking specification data D35.

Thus, the motion tracking unit 71 uses the motion vector data D31 of all the macro blocks associated with the person tracking area 36 (FIG. 3) in the motion vector data D31 forwarded from the motion vector detection unit 70 to roughly detect the movement of each of the macro blocks associated with the person tracking area 36 between each adjacent pair of divided frame data D30 forwarded from the motion vector detection unit 70.

Furthermore, the motion tracking unit 71 detects the person tracking area 36, having been roughly detected, now more specifically by line matching between each adjacent pair of divided frame data 30, so that the movement of each of the macro blocks associated with the person tracking area 36 is detected with high precision.

Furthermore, similarly to the example described earlier with reference to FIG. 4, the motion tracking unit 71 separates the person tracking area 36 specified by the tracking specification data D35, and forwards it to an arbitrary shape extraction unit 72 as person tracking data D32.

The arbitrary shape extraction unit 72 is adapted to accept from outside, when the tracking specification data D35 is input to the motion tracking unit 71, input of extraction specification data D36 specifying an arbitrary point on an object, whereby an object to be extracted from the tracking area specified by the tracking specification data D35 is specified.

In this embodiment, in the arbitrary shape extraction unit 72, similarly to the example described earlier with reference to FIG. 3, an arbitrary point 35A specifying the person object 35 is specified by the extraction specification data D36.

Thus, similarly to the example described earlier with reference to FIG. 4, the arbitrary shape extraction unit 72 detects the edge of the person object 35 from the person tracking area 36 based on the person tracking data D32 forwarded from the motion tracking unit 71, with an assumption that the center of the person object 35 is a pixel associated with the point 35A specified by the extraction specification data D36, leaving the original picture inside the edge as it is while replacing the outside with, for example, pixels representing black so that it will not be displayed on the reception side, whereby the person object 35 is extracted.

Furthermore, similarly to the example described earlier with reference to FIG. 5, the arbitrary shape extraction unit 72 creates a mask pattern picture 37 for exposing the extracted person object 35 while covering the surrounding area of the person object 35 so that the shape of the person object 35 will be presented to the reception side.

The arbitrary shape extraction unit 72 forwards object data of the extracted person object 35 (in this case including the surrounding area in the person tracking area 36, replaced with black pixels), and mask pattern data of the mask pattern picture 37 to an arbitrary shape encoding unit 73 as person object data D33.

The arbitrary shape encoding unit 73 compresses and encodes by the unit of macro blocks of the same as those in the original picture, the object data in the person object data D33 by a relatively low compression rate based on MPEG4, generating encoded data, and also compresses and encodes the mask pattern data in the person object data D33 by a relatively low compression rate, generating encoded mask pattern data.

The arbitrary shape encoding unit 73 forwards the encoded data and the encoded mask pattern data via a transmission/reception unit 74 to the personal computer 63 as encoded person data D34.

Figure 24A:
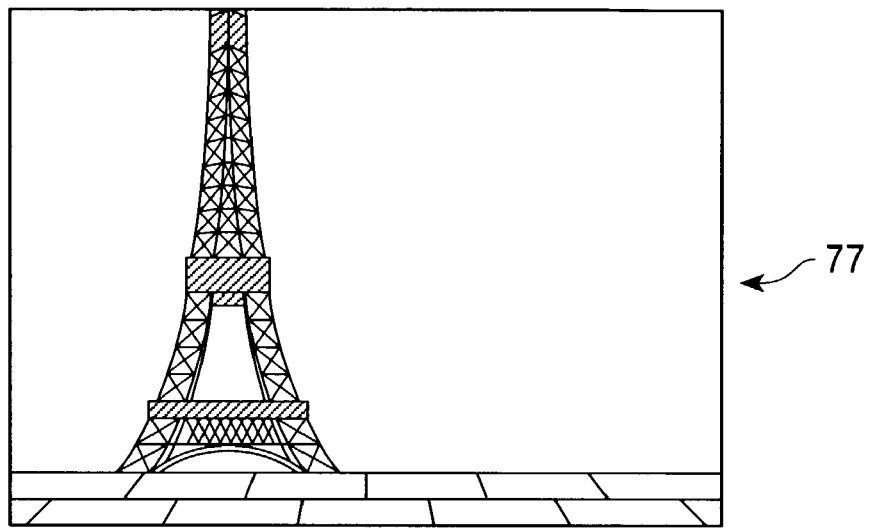
FIGS. 24A and 24B are schematic diagrams showing a second example of tracking area specification.

The arbitrary shape encoding apparatus 62B is constructed identically to the arbitrary shape encoding apparatus 62A. In this embodiment, as shown in FIG. 24A, the arbitrary shape encoding apparatus 62B tracks the entire frame picture (hereinafter referred to as a background tracking area) 77 based on frame data constituting motion picture data supplied from the video camera 61B, extracts the entire tracking area as an object (hereinafter referred to as a background object) 77, and sequentially compresses and encodes each data of the object 77 (hereinafter referred to as background object data) D37 to generate encoded background data D38, transmitting it to the personal computer 63.

Figure 24B:
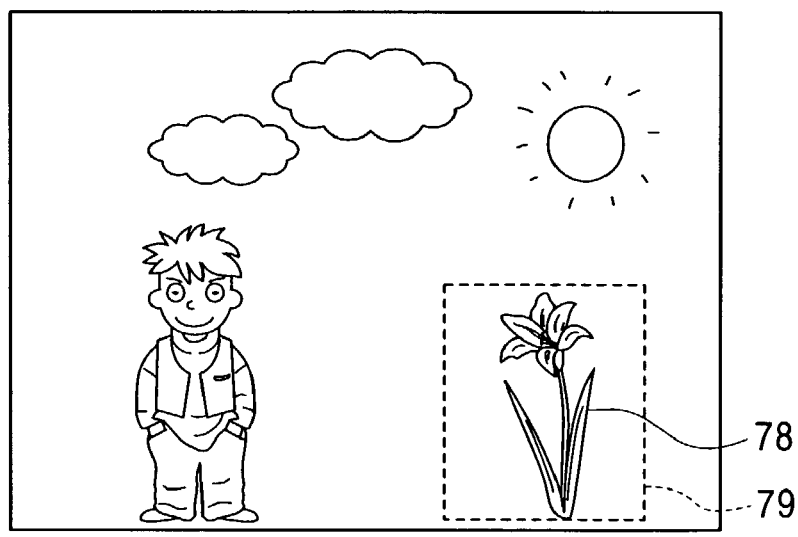

The arbitrary shape encoding apparatus 62C is constructed identically to the arbitrary shape encoding apparatus 62A. In this embodiment, as shown in FIG. 24B, the arbitrary shape encoding apparatus 62C tracks a tracking area (hereinafter referred to as a flower tracking area) 79 including a picture of a flower (hereinafter referred to as a flower object) 78 in the proximity of the bottom right corner of the frame picture based on frame data constituting motion picture data supplied from the video camera 61C, extracts the flower object 78 from the flower tracking area 79, and sequentially compresses and encodes each data of the flower object 78 (hereinafter referred to as flower object data) D39 to generate encoded flower data D40, transmitting it to the personal computer 63.

2.3 Construction of Personal Computer

Figure 25:
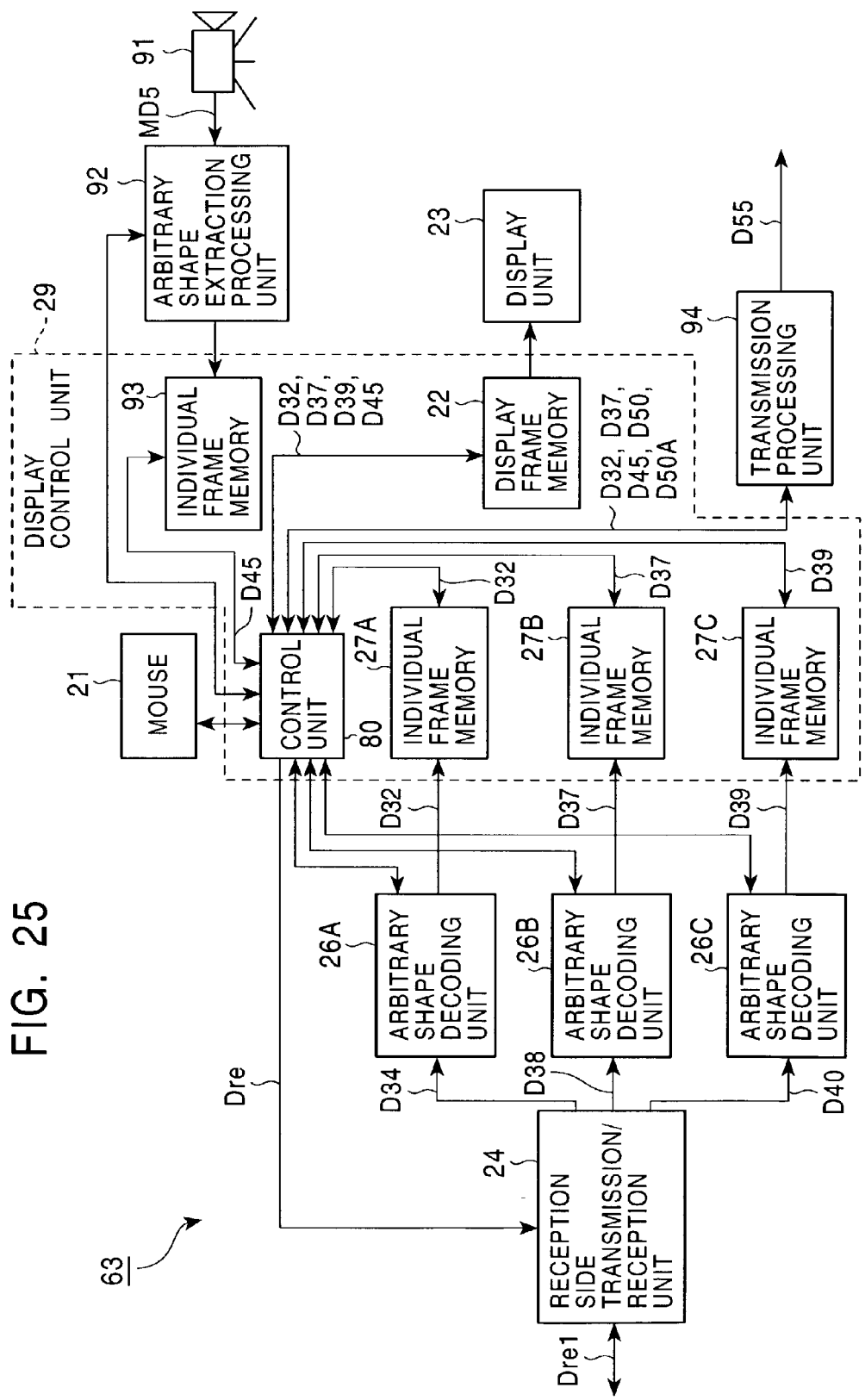
FIG. 25 is a block diagram showing the construction of a personal computer according to the second embodiment.

Referring to FIG. 25, in which parts corresponding to those in FIG. 7 are numbered the same, a control unit 80 of a display control unit 29 has a basic program for running basic operations on a personal computer 63, such as Windows 2000 (trademark of Microsoft Corporation), loaded in an internal RAM, so that when a predetermined operation for requesting distribution of a motion picture is made via a mouse 21 for input operations, the display control unit 29 generates motion picture request data Dre1 and transmits it to arbitrary shape encoding apparatuses 62A to 62C (FIG. 22).

Upon receiving encoded data D34, D38, and D40 from the arbitrary shape encoding apparatuses 62A, 62B, and 62C, a reception side transmission/reception unit 24 arbitrarily allocates and forwards them to arbitrary shape decoding units 26A, 26B, and 26C. In this embodiment, the encoded person data D34 is forwarded to the arbitrary shape decoding unit 26A, the encoded background data D38 to the arbitrary shape decoding unit 26B, and the encoded flower data D40 to the arbitrary shape decoding unit 26C.

Upon receiving the encoded person data D34 forwarded from the reception side transmission/reception unit 24, the arbitrary shape decoding unit 26A decodes the encoded person data D34 to restore the original person object data D33, and stores it in an individual frame memory 27A of the display control unit 29.

Similarly to the arbitrary shape decoding unit 26A, the arbitrary shape decoding units 26B and 26C, upon receiving the encoded background data D38 and the encoded flower data D40 forwarded from the reception side transmission/reception unit 24, decode the encoded background data D38 and the encoded flower data D40 to restore the original background object data D37 and the original flower object data D39, and store them in individual frame memories 27B and 27C of the display control unit 29, respectively.

Written in advance to an internal RAM of the control unit 80 is display specification information D50 including layer order specification data D51 for specifying the order of displaying objects with overlap (hereinafter referred to as a layer order), display specification data D52 for specifying whether or not to display each object, and the center point and the reference point of each object based on each object data and the picture size of each object, stored in the individual frame memories 27A to 27C. The control unit 80 allows arbitrary specification as to display status of each of the objects based on the object data D33, D37, and D39 stored in the individual frame memories 27A, 27B, and 27C according to the display specification information D50 written in advance.

The layer order specification data D51 allows the control unit 80 to repeatedly read object data from the individual frame memories 27A, 27B, and 27C in order according to the specified layer order.

Thus, the control unit 80 repeatedly reads the person object data D33, the background object data D37, and the flower object data D39, in that order, from the individual frame memories 27A, 27B, and 27C, respectively, according to the layer order specification data D51 in the display specification information D50, and stores them in the display frame memory 22.

Then, the control unit 80 determines display configuration of the person object 35 based on the person object data D32, the background object 77 based on the background object data D37, and the flower object 78 based on the flower object data D39 in the display frame memory 22, according to the center coordinate point and reference point of each of the objects and the picture size of each of the objects in the display specification information D50.

The control unit 80 outputs the person object 35, the background object 77, and the flower object 78 to the display unit 23 in the display configuration determined according to the display specification data D52 in the display specification information D50, displaying the objects 35, 77, and 78 on the display unit 23.

Figure 26:
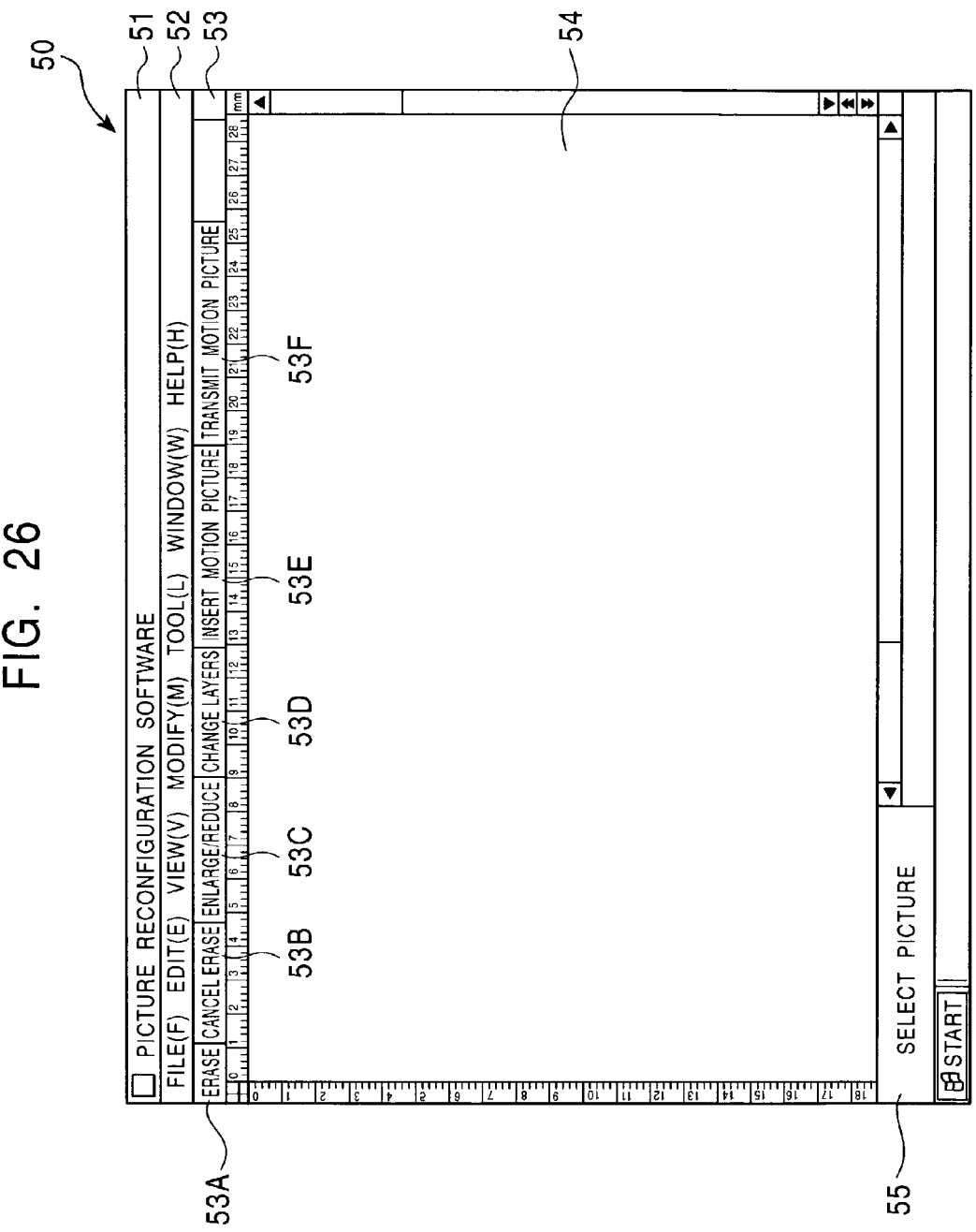
FIG. 26 is a schematic diagram showing an example of window screen according to the second embodiment.

More specifically, when a predetermined operation for requesting distribution of a motion picture is made via the mouse 21, the control unit 80 loads in the internal RAM a motion picture reconfiguration program for displaying a motion picture on a display screen of the display unit 23 and modifying the display configuration of the motion picture in display so that a window screen 90 as shown in FIG. 26, in which parts corresponding to those in FIG. 7 are numbered the same, will be displayed on a desk-top screen of the display unit 23 via the display frame memory 22.

Thus, the control unit 80 determines display configuration in the display frame memory 22 according to the display specification data D52, the center coordinate point and the reference point of each of the objects, and the picture size of each of the objects in the display specification information D50 written in advance to the internal RAM and outputs the result to the display unit 23, so that, for example, the person object 35 is displayed in the display area 54 of the window screen 90 at substantially the same position and in substantially the same size as in the frame pictures (FIG. 3) captured by the video camera 61A (FIG. 22), the background object 77 is displayed in the display area 54 of the window screen 90 at a different position and in a different size from the frame pictures (FIG. 24A) captured by the video camera 61B, and the flower object 78 is displayed in the display area 54 of the window screen 90 at a different position and in a different size from the frame pictures (FIG. 24B) captured by the video camera 61C.

As described above, the control unit 89 determines display configuration of the objects 35, 77, and 78 based on the object data D33, 37, and 39, distributed from the arbitrary shape encoding apparatuses 62A to 62C in response to transmission of motion picture request data Dre1 and then decoded, respectively, in the display frame memory 22 according to the display specification information D50 written in advance in the internal RAM.

Then, the control unit 80 sequentially outputs the objects 35, 77, and 78 according to the display configuration to the display unit 23, displaying the objects 35, 77, and 78 in real time in the display area 54 of the window screen 90 on the display unit 23.

Figure 28:
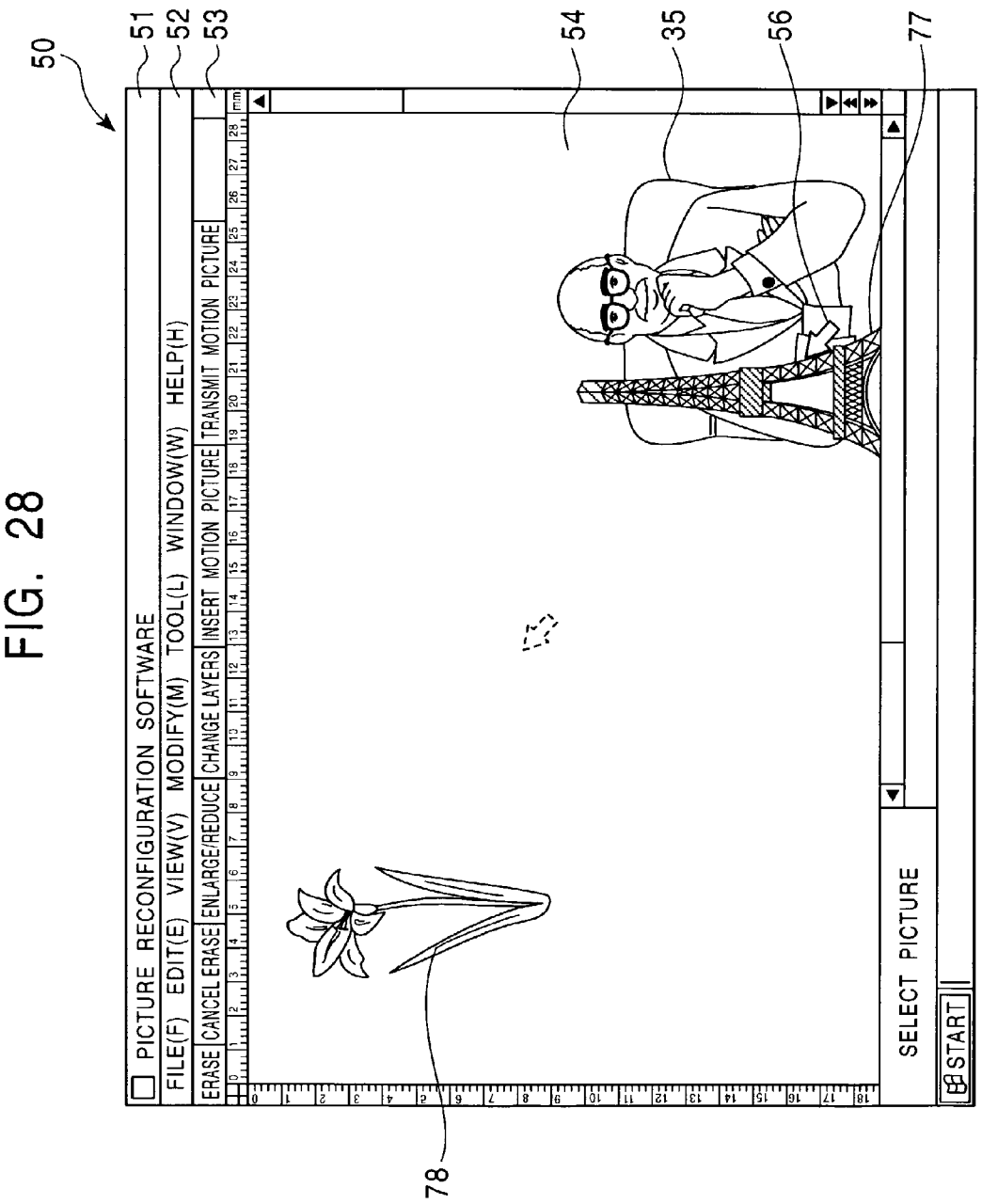
FIG. 28 is a schematic diagram showing a seventh example of modification of display configuration.

Similarly to the example described earlier with reference to FIG. 10, for example, when the mouse 21 is pressed with the cursor 56 placed on the background object 77, the cursor 56 is moved to the bottom right of the window screen 90 with the mouse 21 kept pressed, and then the mouse 21 is unpressed, that is, when a drag operation is performed, the control unit 80 moves the background object 77 from the center of the window screen 90 to the bottom right in accordance with the movement of the cursor 56, as shown in FIG. 28.

That is, the control unit 80 continues changing the reference point of the background object 77 in the preset display specification information D50 in accordance with the distance and direction of the movement of the background object 77. At this time, the control unit 80 outputs the background object 77 to the display unit 23 while modifying display configuration of the background object 77 in the display frame memory 22 using the center coordinate point of the background object 77 based on the modified reference point, whereby the background object 77 is displayed in the display area 54 of the window screen 90 with movement.

Thus, the control unit 80 disregards movement inherent to the background object 77 between adjacent frames while the background object 77 is being moved by the mouse 21, and reflects the inherent movement of the background object 77 between adjacent frames at the position in accordance with the distance and direction of the movement of the background object 77 by the mouse 21.

Furthermore, when the mouse 21 is unpressed, the control unit 80 fixes the reference point to the current modified reference point. Thus, even if the background object 77 is moved to the bottom right of the window screen 90, the control unit 80 displays the background object 77 at the correct position in real time.

Figure 29:
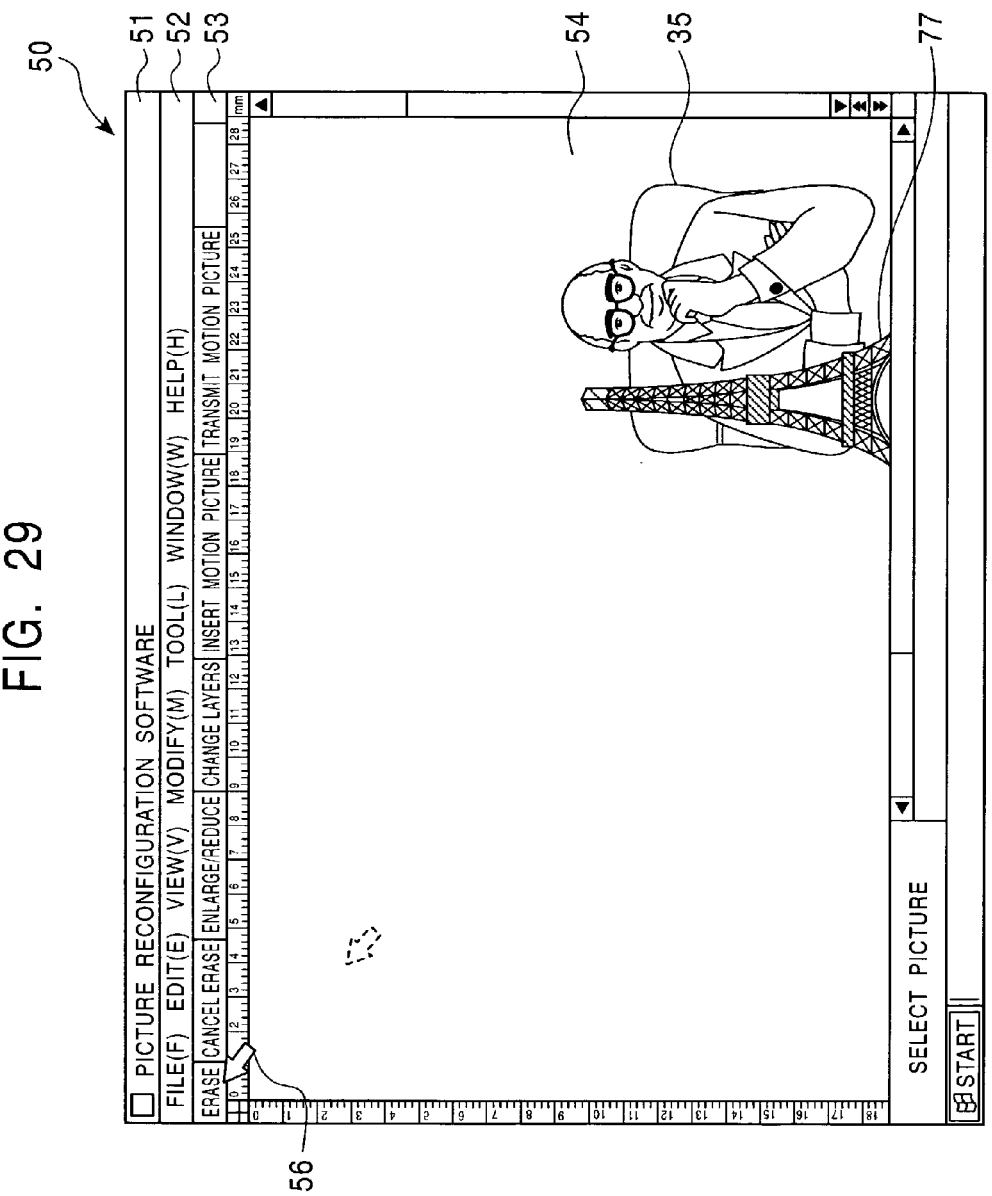
FIG. 29 is a schematic diagram showing an eighth example of modification of display configuration.

Furthermore, subsequent to the state described above with reference to FIG. 28, similarly to the example described earlier with reference to FIG. 11, for example, when the mouse 21 is clicked with the cursor 56 placed on the flower object 78 and then on the erase item 53A on the menu bar 53, decoding process by the arbitrary shape decoding unit 26C (FIG. 24), from which the flower object 77 has been forwarded, is halted to stop forwarding of the flower object data D39 from the arbitrary shape decoding unit 26C to the display frame memory 22 via the individual frame memory 27C, whereby the flower object 78 is erased from the display area 54 of the window screen 90, as shown in FIG. 29.

Thus, the control unit 20 erases the flower object 78 in response to a request from a user operating the mouse 21, and also serves to minimize the overall power consumption of the personal computer 63.

In this case, the control unit 80 changes the display specification data D52 in the display specification information D50, written to the internal RAM, to non-display setting only for the flower object 78. Thus, even when the flower object 78 is erased from the window screen 90, the control unit 80 maintains the status of the flower object 78.

When the cancel erase item 53B on the menu bar 53 is clicked on, the control unit 80 resumes the decoding process by the arbitrary shape decoding unit 26C (FIG. 25) and updates the display specification of the flower object 78 in the display specification data D52 to display setting.

Furthermore, subsequent to the state described above with reference to FIG. 29, similarly to the example described earlier with reference to FIGS. 12 and 13, when the mouse 21 is clicked with the cursor 56 placed on the background object 77 and then on the enlarge/reduce item 53C, the control unit 80 prompts the user with a message saying, for example, "drag corners" in the instruction item 55 and displays an outer edge, which is not displayed in the background object 77, in broken line.

Figure 30:
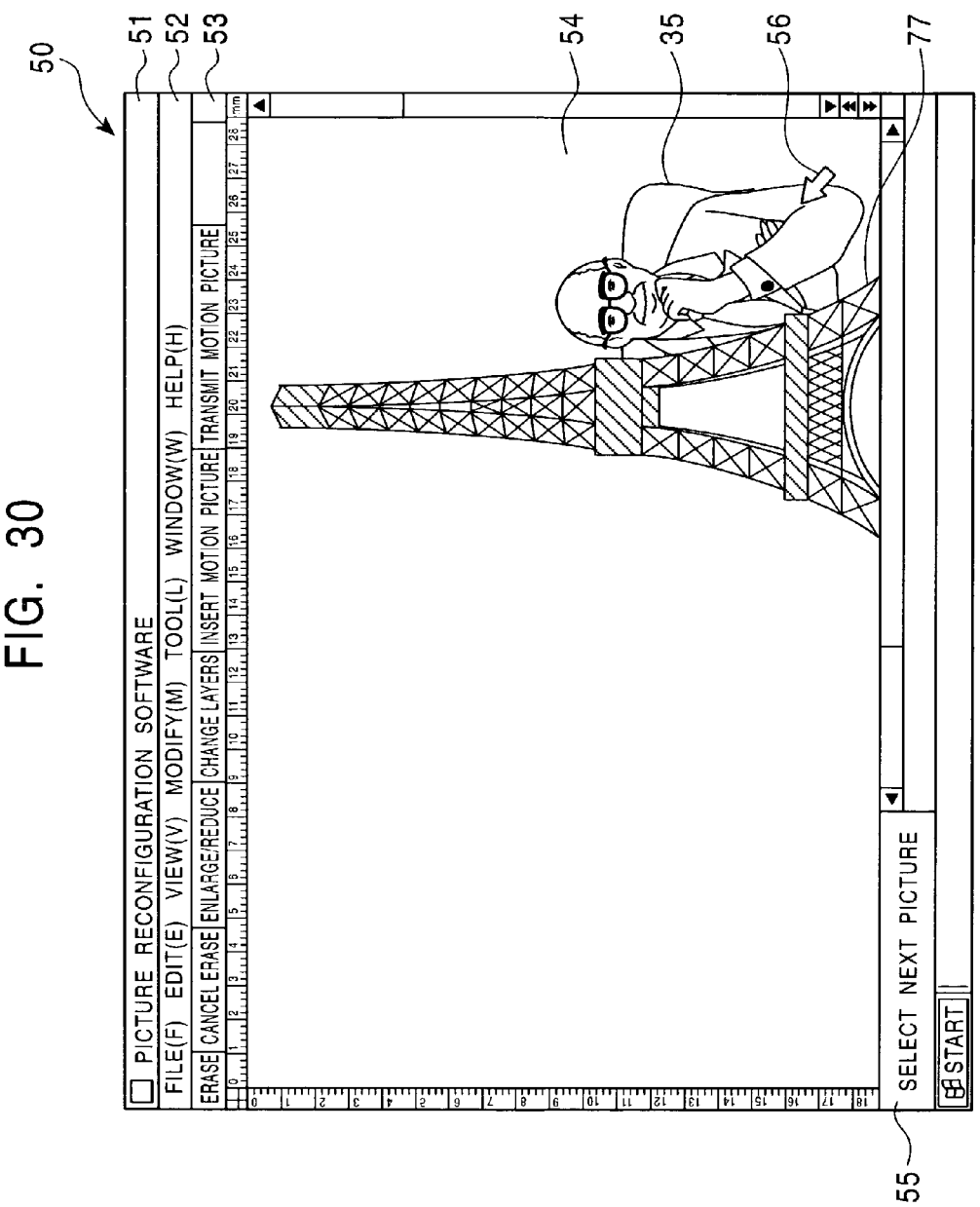
FIG. 30 is a schematic diagram showing a ninth example of modification of display configuration.

In this state, if, for example, the top left corner of the edge, shown in broken line, is dragged towards the top left of the display area 54 of the window screen 90, the control unit 80 enlarges the background object 77 in the edge, shown in broken line, in accordance with the movement, as shown in FIG. 30.

That is, the control unit 80 continues modifying the picture size of the background object 77 in the display specification information D50 in accordance with the distance and direction of the movement of the background object 77. At this time, the control unit 80 sequentially reads the background object data D37 (FIG. 25) from the individual frame memory 27B and stores it in the display frame memory 22 while interpolating the background object data D37 according to the modified picture size without changing the aspect ratio. The control unit 80 then outputs the background object 77 based on the interpolated background object data D37 to the display unit 23, displaying the enlarged background object 77 in the display area 54 of the window screen 90.

Furthermore, when the mouse 21 is unpressed, the control unit 80 fixes the picture size to the current modified picture size. Thus, even if the background object 77 is enlarged, the control unit 80 displays the background object 77 in the enlarged size in real time.

On the other hand, when the user is prompted with a message saying, for example, "drag corners" in the instruction item 55 with the edge displayed in broken line, for example, if the top left corner of the edge is dragged towards the bottom right of the display area 54 of the window screen 90, the control unit 80 reduces the background object 77 in accordance with the movement.

Furthermore, subsequent to the state described above with reference to FIG. 30, similarly to the example described earlier with reference to FIG. 14, if the mouse 21 is clicked with the cursor 56 placed on the background object 77 and then on the change layers item 53D on the menu bar 53, the control unit 80 prompts the user with a message saying, for example, "select next object" in the instruction item 55 and displays the outer edge, not displayed in the background object 77, in broken line.

Figure 31:
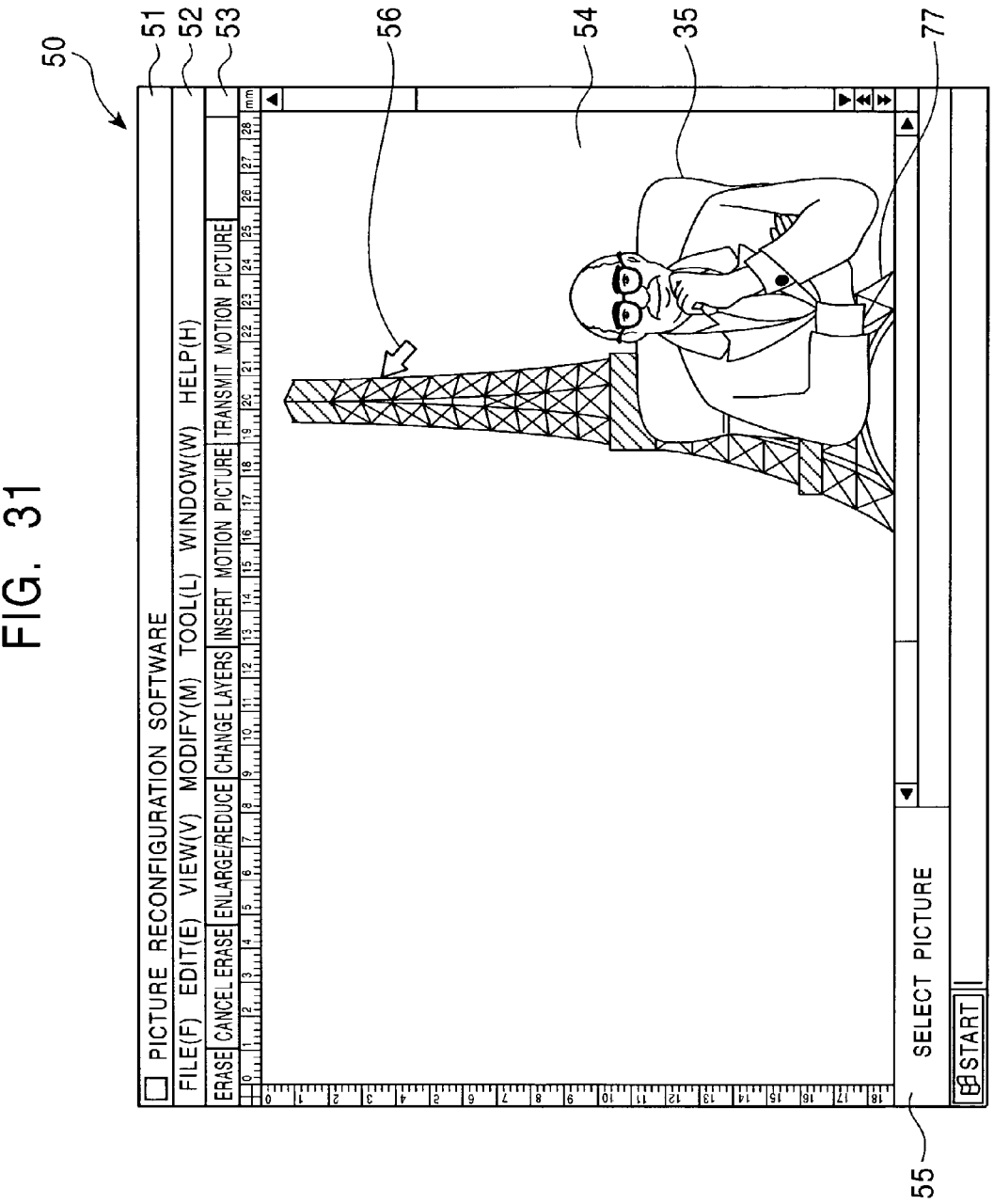
FIG. 31 is a schematic diagram showing a tenth example of modification of display configuration.

In this state, when, for example, the mouse 21 is clicked with the cursor 56 placed on the person object 35, the control unit 80 reverses the order of layers between the background object 77 and the person object 35, as shown in FIG. 31.

That is, the control unit 80 modifies the layer order specification data D51 in the display specification information D50 in which the flower object 78 is specified to be on the uppermost layer, the background object 77 on the intermediate layer, the person object 35 on the lowermost layer so that the background object 77 is now on the lowermost layer and the person object 35 on the intermediate layer, maintaining the modified layer order.

Thus, the control unit 80 repeatedly reads the background object data D37 and the person object data D33, in that order, from the individual frame memories 27A to 27C according to the modified layer order specification data D51, storing them in the display frame memory 22. The control unit 80 then determines display configuration of the person object 35 and the background object 77 in the display frame memory 22 and outputs the result to the display unit 23, whereby the person object 35 is displayed on the intermediate layer on the display unit 23.

As described above, the control unit 80 modifies the display specification information D50 according to various operations of the mouse 21, controlling the individual frame memories 27A, 27B, and 27C and the display frame memory 22 according to the modified display specification information D50, so that display configuration of the objects 77, 78, and 35 on the display area 54 of the window screen 90 can be modified.

In addition to the items 53A to 53D, on the menu bar 53 of the window screen 90 (FIG. 26), an insert motion picture item 53E for inserting a new motion picture in the display area 54 is provided.

Thus, subsequent to the state described above with reference to FIG. 31, for example, if the mouse 21 is clicked with the cursor 56 placed on the insert motion picture item 53E, the control unit 80 starts an object extraction process by an arbitrary shape extraction processing unit 92 (FIG. 25).

In this case, similarly to the motion vector detection unit 70, the motion tracking unit 71, and the arbitrary shape extraction unit 72 described earlier with reference to FIG. 23, the arbitrary shape extraction processing unit 92 tracks a tracking area (hereinafter referred to as an eye tracking area) 97 specified in advance in frame pictures based on frame data constituting motion picture data MD5 acquired by imaging a target with a video camera 91, and extracts an object (hereinafter referred to as an eye object) 98 based on an arbitrary point on the object specified in advance, storing each object data 45 of the eye object 98 sequentially in an individual frame memory 93.

In the internal RAM of the control unit 80, the center point, the reference point, and the picture size of the object based on the object data D45 stored in the individual frame memory 93 is also written as additional display specification information D50A, so that the control unit 80 is allowed to arbitrarily specify display status of the eye object 98 based on the object data 45 stored in the individual frame memory 93, according to the additional display specification information 50A.

Thus, the control unit 80 determines display configuration of the objects 35, 77, and 78 based on the object data D33, D37, and D39 stored in the individual frame memories 27A, 27B, and 27C, respectively, according to the display specification information D50 written in advance, and also determines display configuration of the eye object 98 based on the object data 45 stored in the individual frame memory 93 according to the additional display specification information D50A, and outputs the results to the display unit 23, so that, for example, the objects 35, 77, and 78, and the eye object 98 extracted by the arbitrary shape extraction processing unit 92 are displayed on the display unit 23.

Furthermore, on the menu bar 53 of the window screen 90 (FIG. 26), provided in addition to the items 53A to 53D is a transmit motion picture item 53F for transmitting a motion picture to another personal computer in real time after display configuration currently being received has been modified.

Thus, subsequent to the state described above with reference to FIG. 33, for example, if the mouse 21 is clicked with the cursor 56 placed on the transmit motion picture item 53F, upon each time reading the object data D33, D37, and D45 from the individual frame memories 27A, 27B, and 93 according to the display specification information D50 and the additional display specification information D50A, the control unit 80 displays the objects 35, 77, and 98 on the display unit 23 via the display frame memory 22 (FIG. 33) and also forwards the object data D33, D37, and D45 to a transmission processing unit 94.

At this time, the control unit 80 also forwards to the transmission processing unit 94 the display specification information D50 and the additional display specification information D50A at the time when the transmit motion picture item 53F is clicked on, and starts an encoding process by the transmission processing unit 94.

In this case, the transmission processing unit 94 again compresses and encodes the object data D33 and D37 forwarded from the control unit 80 to generate encoded data D34 and D38, compresses and encodes the eye object data D45 forwarded from the control unit 80 to generate encoded eye data D53, and also compresses and encodes the display specification information D50 and the additional display specification information D50A to generate encoded display specification data D54 and encoded additional display specification information D54A. The transmission processing unit 94 then multiplexes the encoded data D34, D38, and D53, and the encoded display specification data D54 and the encoded additional display specification data D54A to generate multiplexed data D55, transmitting it to the personal computer 64.

As described above, the control unit 80 controls the individual frame memories 27A, 27B, and 27C, and the display frame memory 22 according to the modified display specification information D50 so that a new object may be added as required to the display area 54 of the window screen 90 in which the objects are displayed, and so that data of the objects may be transmitted to the personal computer 64 in real time.

The personal computer 64 is constructed identically to the personal computer 63, and description thereof will be omitted.

2.4 Procedure of Display Status Modifying Process

Figure 34:
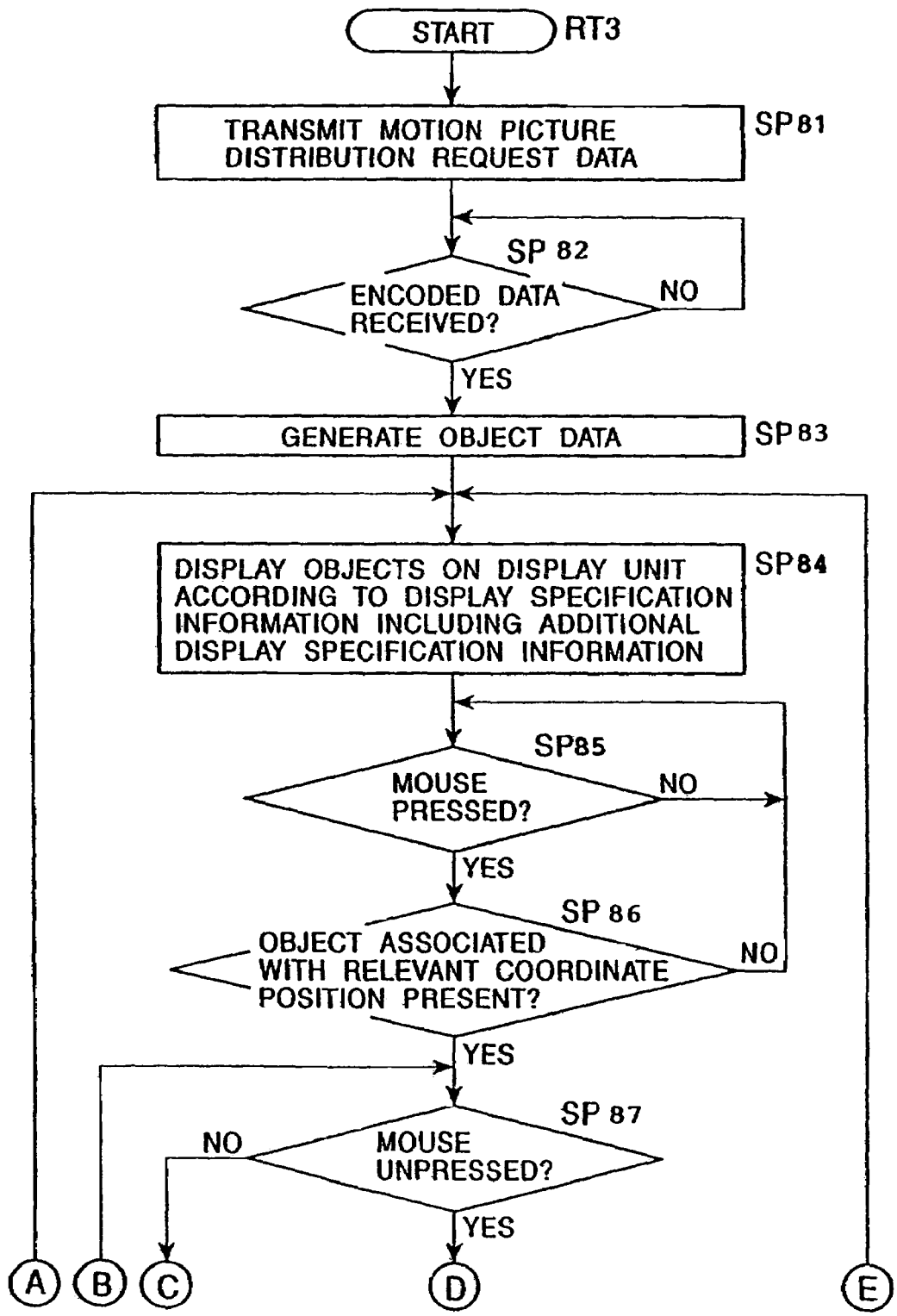
FIG. 34 is a flowchart showing the procedure of a display process (C)

The procedure of the display status modifying process by the personal computer 63 (or the personal computer 64) will be summarized below. Referring to FIG. 34, in which parts corresponding to those in FIG. 16 are numbered the same, upon starting a routine RT3, the personal computer 63 (64) enters step SP21.

In step SP21, the personal computer 63 (64) transmits to the arbitrary shape encoding apparatuses 62A to 62C motion picture distribution request data Dre1 generated in response to a predetermined operation of the mouse 21 for requesting distribution of a motion picture. Then in step SP22, the personal computer 63 (64) receives the encoded data D34, D38, and D40 (FIG. 25) distributed from the arbitrary shape encoding apparatuses 62A to 62C, respectively, and then proceeds to step SP23.

Figure 27:
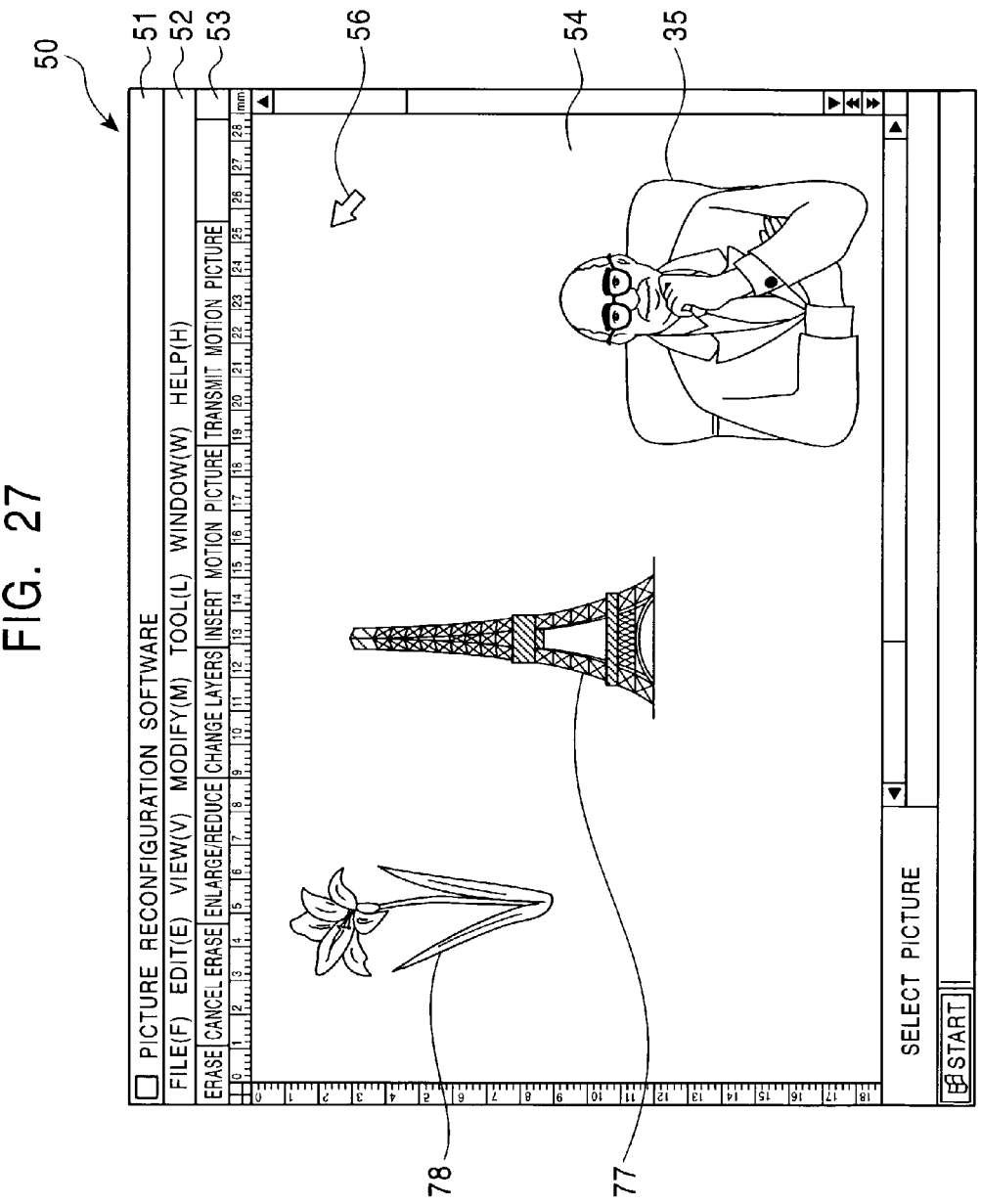
FIG. 27 is a schematic diagram showing a second example of display of objects in a display area.

In step SP23, the personal computer 63 (64) decodes the encoded data D34, D38, and D40 to restore the object data D33, D37, and D38. Then in step SP24, the personal computer 63 (64) determines display configuration of the objects 35, 78, and 79 based on the object data D33, D37, and D38 according to the display specification information D50 stored in advance in the internal RAM, displays the objects 35, 78, and 79 on the display unit 23 (FIG. 27), and then proceeds to step SP25.

Figure 35:
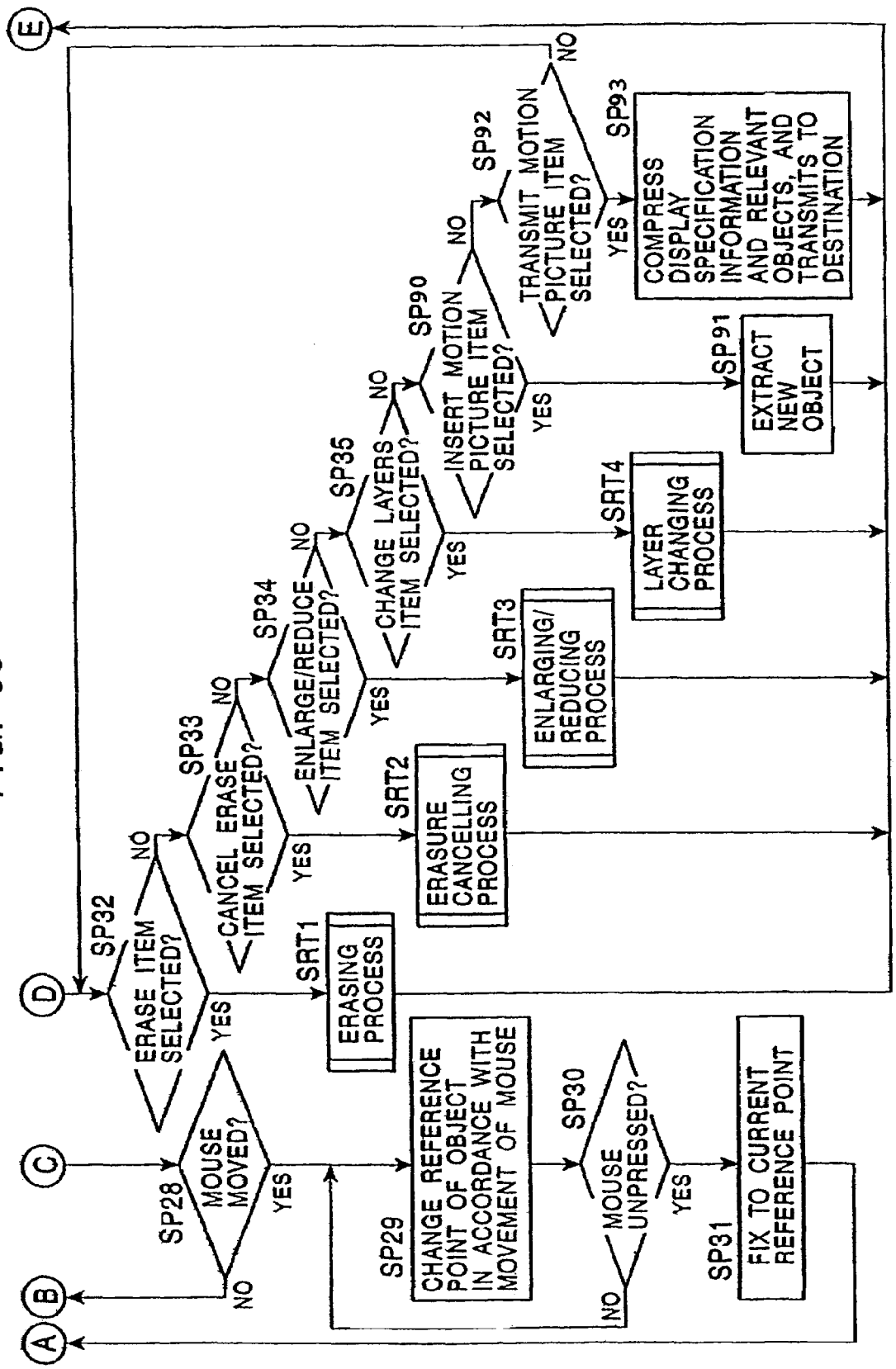
FIG. 35 is a flowchart showing the procedure of a display process (D)

If the mouse 21 is pressed in step SP25 and an object is present at the position at which the mouse 21 is pressed in step SP26, the personal computer 63 (64) determines in step SP27 whether the mouse 21 has been unpressed. If the test turns out negative, the personal computer 63 (64) proceeds to step SP28 (FIG. 35).

If the mouse 21 is moved in step SP28, then in step SP29, the personal computer 63 (64) modifies the reference point of the selected object in the display specification information D50 in accordance with the distance and direction of the movement of the mouse 21, and then proceeds to step SP30.

If the mouse 21 is unpressed in step SP30, then in step SP31, the personal computer 63 (64) fixes the reference point of the selected object in the display specification information D50 to the reference point at the time when the mouse 21 is unpressed. The personal computer 63 (64) then returns to step SP24 and determines display configuration of the selected object based on the fixed reference point (FIG. 28).

If the test in step SP27 turns out positive, indicating that an operation associated with one of the items 53A to 53D on the menu bar 53 (FIG. 26) is to be executed on the selected object, the personal computer 63 (64) proceeds to step SP32.

If the erase item 53A is clicked on in step SP32, the personal computer 63 (64) executes the erasing process (FIG. 18) described earlier, halting decoding process for encoded data associated with the object selected in step SP26 (FIG. 34) to erase the selected object (FIG. 29), and modifies the display specification data D21 in the display specification information D50 to non-display setting only for the selected object. The personal computer 63 (64) then returns to step SP24 (FIG. 34) and continues determination of display configuration according to the modified display specification information D50.

If the erase item 53A is not clicked on in step SP32, indicating that erasure of the selected object is not desired, the personal computer 63 (64) proceeds to step SP33.

If the cancel erase item 53B is clicked on in step SP33, the personal computer 63 (64) executes the erasure cancelling process (FIG. 19) described earlier, resuming the decoding process for the encoded data associated with the object selected in step SP26 (FIG. 34) and modifying the display specification of the selected object from non-display setting to display setting. The personal computer 63 (64) then returns to step SP24 (FIG. 34) and continues determination of display configuration according to the modified display specification information D50.

If the cancel erase item 53B is not clicked on in step SP33, indicating that cancelling of erasure of the selected object is not desired, the personal computer 63 (64) proceeds to step SP34.

If the enlarge/reduce item 53C is clicked on in step SP34, the personal computer 63 (64) executes the enlarging/reducing process (FIG. 20) described earlier to modify the picture size of the selected object in the display specification information D50 in accordance with the distance and direction of movement of the mouse 21 (FIG. 30), interpolating object data of the selected object in accordance with the modified picture size.

When the mouse 21 is unpressed, the personal computer 63 (64) fixes the picture size to the picture size at the time when the mouse 21 is unpressed. The personal computer 63 then returns to step SP24 (FIG. 34) and continues determination of display configuration according to the fixed display specification information.

On the other hand, if the enlarge/reduce item 53C is not clicked on in step SP34, indicating that enlarging/reducing of the selected object is not desired, the personal computer 63 (64) proceeds to step SP35.

When the change layers item 53D is clicked on in step SP35, the personal computer 63 (64) executes the layer changing process (FIG. 21) described earlier, so that when a new object for which layers are to be changed with the selected object is selected in response to a prompt of selection, the personal computer 63 (64) changes layers between the object selected in step SP26 (FIG. 34) and the new object selected in step SP71 (FIG. 31). The personal computer 63 (64) then returns to step SP24 (FIG. 34) and continues determination of display configuration according to the modified display specification information D50.

On the other hand, if the change layers item 53D is not clicked on in step SP35, indicating that layer is not desired to be changed for the selected object, the personal computer 63 (64) proceeds to step SP80.

In step SP80, the personal computer 63 (64) determines whether the insert motion picture item 53E has been clicked on. If the test turns out positive, the personal computer 63 (64) proceeds to step SP81.

Figure 32:
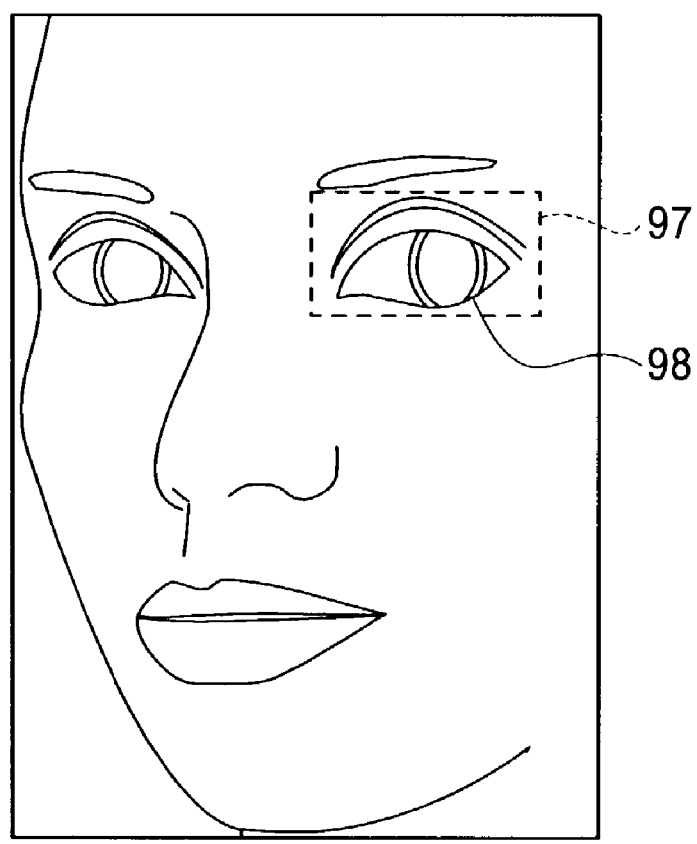
FIG. 32 is a schematic diagram showing a third example of tracking area specification.
Figure 33:
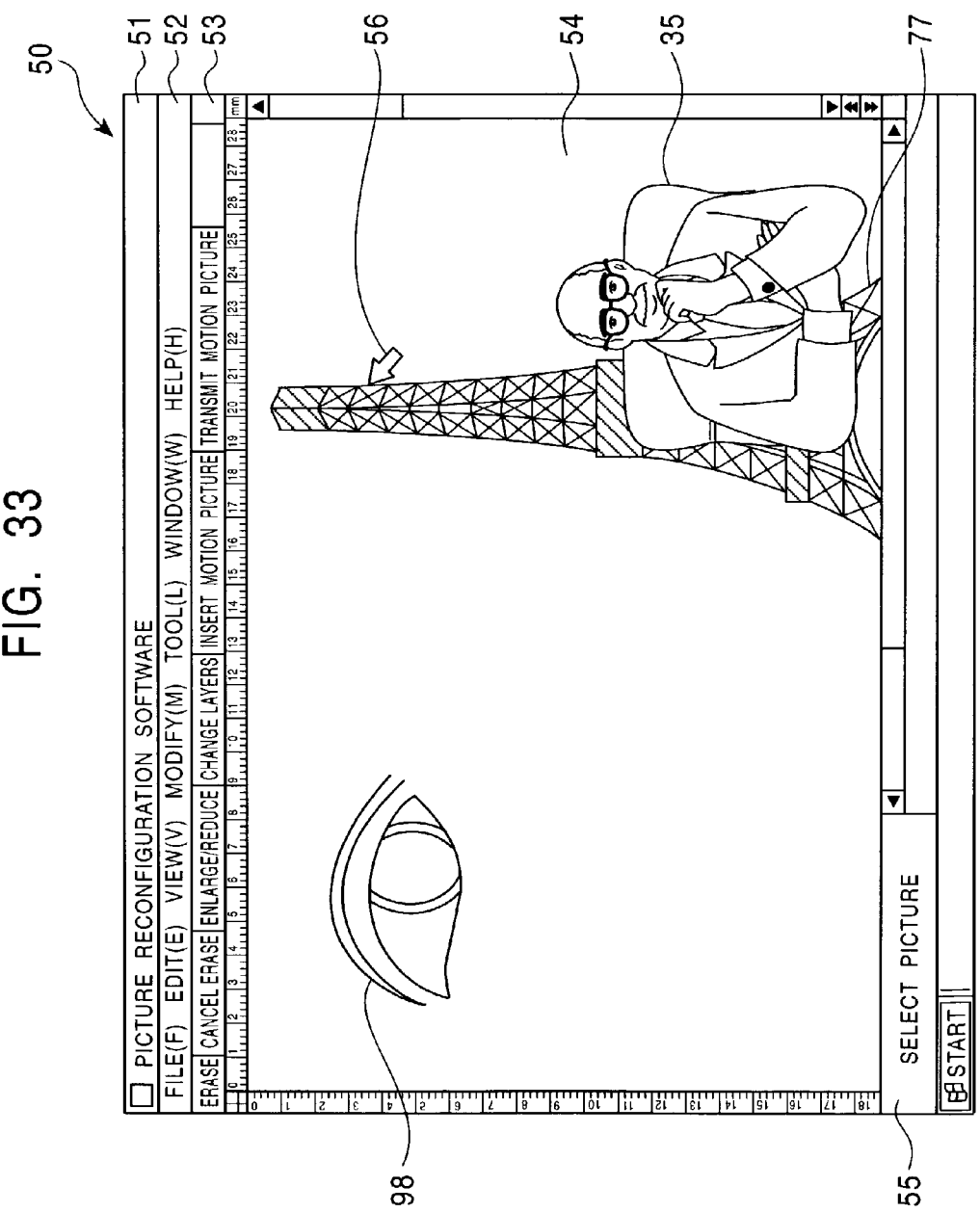
FIG. 33 is a schematic diagram showing an eleventh example of modification of display configuration.

In step SP81, the personal computer 63 (64) tracks a tracking area 97 (FIG. 32) specified in advance in frame pictures based on frame data constituting the motion picture MD5 acquired by the video camera 91, and sequentially extracts an object from the tracking area 97 based on an point on the object arbitrarily specified in advance. The personal computer 63 (64) then returns to step SP24 (FIG. 34) and continues determination of display configuration also for the extracted object according to the display specification information D50 and the additional display specification information D50A (FIG. 33).

On the other hand, if the test in step SP80 turns out negative, indicating that insertion of a motion picture into the selected object is not desired, the personal computer 63 (64) proceeds to step SP82.

In step SP82, the personal computer 63 (64) determines whether the transmit motion picture item 53F has been clicked on. If the test turns out positive, the personal computer 63 (64) proceeds to step SP83.

In step SP83, the personal computer 63 (64) transmits to a destination personal computer the encoded display specification data D54 (encoded additional display specification data D54A) obtained by compressing and encoding the display specification information D50 (the additional display specification information D50A), and if the mouse 21 is clicked in step SP82, also transmits encoded data obtained by sequentially compressing and encoding objects whose display configuration is to be determined in step SP24 (FIG. 34) after the click operation. The personal computer 63 (64) then returns to step SP24 (FIG. 34) and continues determination of display configuration for the objects according to the display specification information D50.

On the other hand, if the test in step SP83 turns out negative, indicating that none of the items 53A to 53F on the menu bar 53 has not been selected yet for the selected object, the personal computer 63 (64) loops through steps SP32, SP33, SP34, SP35, SP80, and SP82 until one of the items 53A to 53F is clicked on.

As described above, the personal computer 63 (64) receives the encoded data D34, D38, and D40 (FIG. 25) distributed from the arbitrary shape encoding apparatuses 62A to 62C (the personal computer 63), determines display configuration of the objects 35, 77, 78, and 98 based on the object data according to the display specification information D50 and outputs the result to the display unit 23, displaying the objects in real time on the display unit 23.

Furthermore, the personal computer 63 (64) modifies the display specification information D50 in accordance with various operations of the mouse 21, and controls the individual frame memories 27A, 27B, 27C, and 93, and the display frame memory 22 according to the modified display specification information D50, so that display configuration of the objects 35, 77, 78, and 98 displayed in the display area 54 of the window screen 90 can be modified.

In addition, the personal computer 63 (64) controls the individual frame memories 27A, 27B, and 27C, and the display frame memory 22 so that a new object may be added to the display area 54 as required while displaying the objects in the display area 54 of the window screen 90, and so that data of the objects can be transmitted to another personal computer in real time.

2.5 Operation and Advantages

According to the motion picture distribution system 100 described above, when the insert motion picture item 53E is clicked on, the personal computer 63 (64) generates the eye object 98 for additional display on the display unit 23 by the arbitrary shape extraction processing unit 92 that constitutes additional object generation means, generates the additional display specification information D50A specifying display status of the eye object 98 by the control unit 80 that constitutes additional information generation means, and additionally displays the eye object 98 on the display unit 23 according to the additional display specification information D50A by the display control unit 29. Accordingly, intention of the user operating the mouse 21 can be further reflected.

When the transmit motion picture item 53F is clicked on, the personal computer 63 (64) transmits, by the transmission processing unit 94 that constitutes transmission means, the objects 35, 77, and 98 displayed on the display unit 23 and the display specification information D50 (the additional display specification information D50A) whose specification contents have been modified. Accordingly, an object on which intention of the user operating the mouse 21 is reflected can be provided to other users.

According to the motion picture distribution system 100 described above, a new object 98 can be added as required to the display area 54 and can also be transmitted to another personal computer 64 in real time. Accordingly, in addition to the advantages of the first embodiment, intention of the user operating the mouse 21 can be further reflected on an object. Furthermore, the object with the user's intention reflected thereon can be provided to other users, which serves to popularize distribution of picture.

Although the second embodiment has been described in relation to a case where the arbitrary shape encoding apparatuses 62A to 62C and the personal computer 63 detects motion vector by sequentially reading each subject frame data D1 of motion picture data acquired by imaging targets with the respectively associated video cameras 61A to 61C and 91, the present invention is not limited thereto, and motion vector may be detected by sequentially reading each subject frame data of motion picture data from an HDD.

Furthermore, although the second embodiment has been described in relation to a case where the control unit 80 of the personal computer 63 determines display configuration of the objects 35, 77, 78, and 98 according to the display specification information D50 (the additional display specification information D50A) stored in advance, the present invention is not limited thereto. For example, the arbitrary shape encoding apparatuses 62A to 62C may be each provided with the display specification information generation unit 13 described earlier with reference to FIG. 2 so that display specification information generated by the display specification information generation unit 13 is transmitted from the arbitrary shape encoding apparatuses 62A to 62C and display configuration of the objects is determined according to the display specification information.

Furthermore, although the second embodiment has been described in relation to a case where the personal computer 63 (64) is used as a display status modifying apparatus, the present invention is not limited thereto, and may also be applied to various display status modifying apparatuses in the form of, for example, PDAs (Personal Digital Assistants) or cellular phones.

In this case, the display status modifying apparatuses halt the decoding process by the arbitrary shape decoding units 26A to 26C from which the objects 35, 77, and 78 originate, as specified by the mouse 21. Thus, by selectively erasing the objects 35, 77, and 78 in accordance with available processing capability, usability of the display status modifying apparatuses can be improved.

3. Modifications

Although the embodiments have been described in relation to cases where motion vector is sequentially detected for each subject frame data D1 of motion picture data acquired by the video cameras 61A to 61C and 91 or recorded in the HDD 6, the present invention is not limited thereto. For example, motion vector may be sequentially detected for each subject frame data D1 of data obtained by encoding objects (the encoded scenery data D6, the encoded telop data D9, the encoded person data D12 and D34, the encoded background data D38, and the encoded flower data D40) and recorded on a recording medium such as a DVD (Digital Versatile Disk) externally connected.

Figure 36:
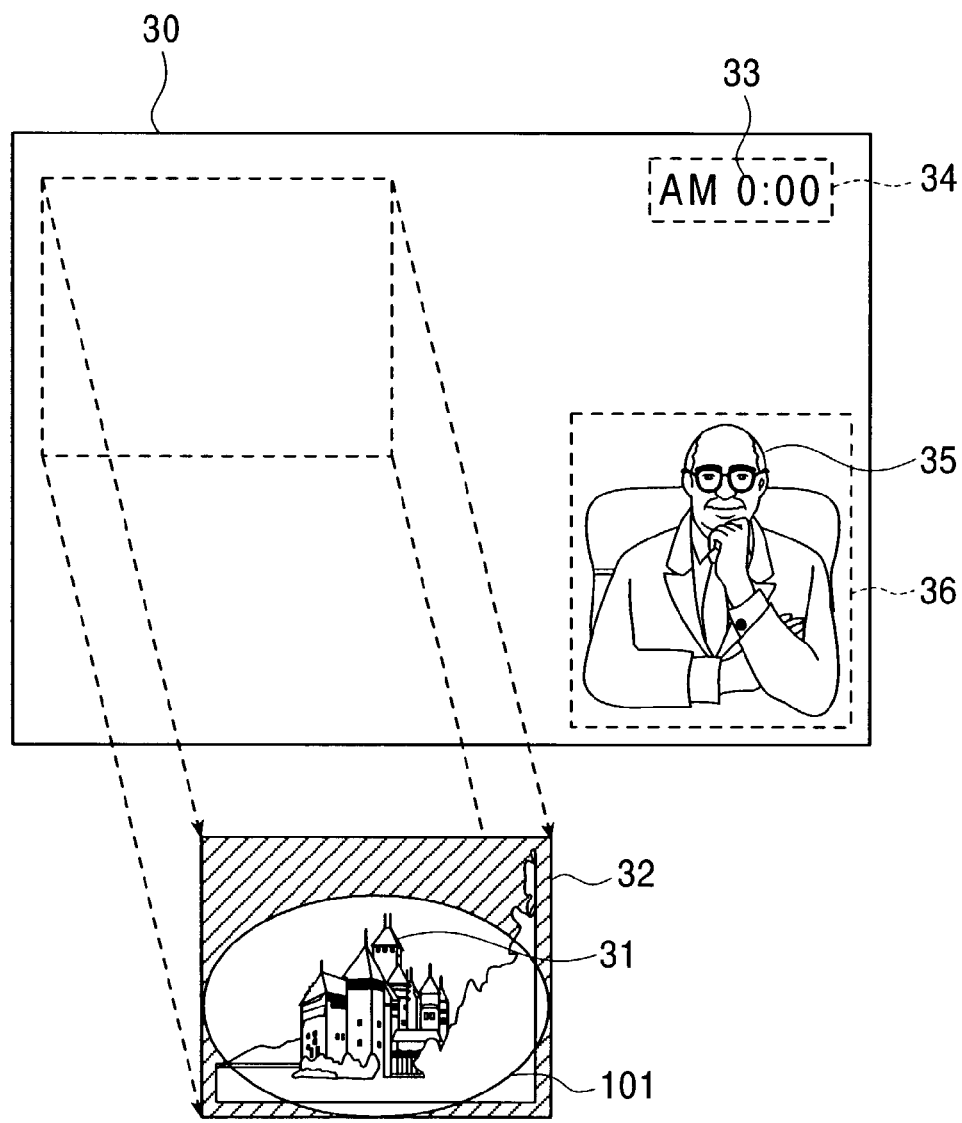
FIG. 36 is a schematic diagram showing a second example of object extraction.

Furthermore, although the embodiments have been described in relation to cases where the objects 31, 33, 35, 77, 78, and 98 are extracted along the edges thereof from the tracking areas 32, 34, 36, 77, 79, and 97, respectively, the present invention is not limited thereto. For example, as shown in FIG. 36, the arrangement may be such that an elliptic frame 101 is set in advance so that extraction is performed along the frame 101, or frames of various shapes, for example, star shaped on circular, may be set to the motion vector detection unit 7, allowing extraction of arbitrary shapes.

Furthermore, although the embodiments have been described in relation to cases where the motion vector detection units 7 and 70 that detects motion vector by the unit of macro block are used as motion vector detection means for detecting motion vector between frames of motion picture data, the present invention is not limited thereto, and other types of motion vector detection means, for example, motion detection means that detects motion vector based on optical flow, may be used as long as motion vector between frames of motion picture data can be detected.

Furthermore, although the embodiments have been described in relation to cases where the objects 31, 33, 35, 77, 78, and 98 are extracted by tracking the tracking areas 32, 34, 36, 77, 79, and 97, respectively, for each subject frame data D1, the present invention is not limited thereto, and the objects may be extracted when the tracking areas are tracked between an arbitrary pair of subject frame data D1. In that case, load of the extraction process is reduced.

Furthermore, although the embodiments have been described in relation to cases where the arbitrary shape encoding units 10A to 10C, 73, and the display specification information encoding unit 14 performs compression encoding according to MPEG4, the present invention is not limited thereto, and other compression encoding methods, for example, MPEG2 or MPEG1, may be used.

Furthermore, although the embodiments have been described in relation to cases where display status of the objects 31, 33, 35, 77, 78, and 98 is modified via the mouse 21 that constitutes input means, the present invention is not limited thereto, and other types of input means, for example, a touch panel, may be used.

Furthermore, although the embodiments have been described in relation to cases where the display control unit 29 that constitutes display status modification means allows erasing operation, erasure cancelling operation, enlarging/reducing operation, and layer changing operation on objects, the present invention is not limited thereto, and various other operations for modifying display status, for example, rotation, may be provided.

Furthermore, although the embodiments have been described in relation to the motion picture distribution system 1 constructed by linking the motion picture distribution server 2 that constitutes a motion picture distribution apparatus and the personal computer 3 that constitutes a display status modifying apparatus with each other via the Internet 4, and the motion picture distribution system constructed by linking the arbitrary shape encoding apparatuses 62A to 62C that constitute motion picture distribution apparatuses and the personal computers 63 and 64 that constitute display status modifying apparatuses with each other via the Internet 65, the present invention is not limited thereto. The present invention may be applied to motion picture distribution systems constructed of various other combinations of motion picture distribution apparatuses, display status modifying apparatuses, and networks, for example, a motion picture distribution system constructed by linking a personal computer with an integrated video camera, and cellular phones with each other via the Internet, a motion picture distribution system constructed by linking a cellular phone to which a video camera is connected, and PDAs (Personal Digital Assistants) with each other via a private line, or a motion picture distribution system constructed by linking a television broadcasting apparatus and television apparatuses via satellite.

In that case, the motion picture distribution apparatus may execute the motion picture distribution process either in hardware using the circuit block described with reference to FIG. 2 or FIG. 23, or in software by installing a motion picture distribution process program for executing the motion picture distribution process described with reference to FIG. 6 on the motion picture distribution apparatus so that the motion picture distribution apparatus executes the motion picture distribution process.

Furthermore, the display status modifying apparatus may execute the display status modifying process either in hardware using the circuit blocks described with reference to FIGS. 7 and 25, or in software by installing a display status modifying program for executing the display status modifying process described with reference to FIGS. 16 and 17 or FIGS. 34 and 35 on the display status modifying apparatus so that the display status modifying apparatus executes the display status modifying process.

Furthermore, when installing the motion picture distribution program and the display status modifying program on the motion picture distribution apparatus and the display status modifying apparatus, respectively, a program storage medium storing both or one of the motion picture distribution program and the display status modifying program may be used. Alternatively, wired or wireless communication channel, for example, a local area network, the Internet, or digital satellite broadcasting, may be used, and installation may be performed via various communication interfaces such as routers and modems.

The program storage medium, storing both or one of the motion picture distribution program and the display status modifying program for installation on the motion picture distribution apparatus and the display status modifying apparatus to allow execution of the motion picture distribution program and the display status modifying program, may be, for example, a package medium such as a floppy disk, a CD-ROM (Compact Disk Read-Only Memory), or a DVD (Digital Versatile Disk), and may also be a semiconductor memory, a magnetic disk, on which the programs are temporarily or permanently stored. The programs may be stored in the program storage medium via a local area network or the Internet, or may be stored via various communication interfaces such as routers and modems.

What is claimed is:

1. A display status modifying apparatus comprising:
reception means for receiving from outside an object including a plurality of pictures of an arbitrary shape extracted from motion picture scenes;
display control means for displaying the object on predetermined display means according to display specification information that specifies a display status of the object,
wherein the display specification information includes a reference point, a picture size, and layer order specification data for each picture of said plurality of pictures, said layer order specification data providing an order for displaying the plurality of pictures extracted from the motion picture scenes;
input means for inputting a modification instruction for modifying the display status of the object displayed on said display means; and
specification content modification means for modifying specified content of the display specification information according to the modification instruction.

2. A display status modifying apparatus according to claim 1, further comprising:
additional object generation means for generating an additional object including a plurality of pictures of an arbitrary shape extracted from motion picture scenes, which is to be additionally displayed on said display means; and
additional information generation means for generating additional display status specification information that specifies a display status of the additional object;
wherein said display control means additionally displays the additional object on said display means according to the additional display status specification information.

3. A display status modifying apparatus according to claim 1, further comprising
transmission means for transmitting the object displayed on said display means and the display specification information whose content has been modified.

4. A display status modifying method comprising:
a reception step of receiving from outside an object including a plurality of pictures of an arbitrary shape extracted from motion picture scenes;
a display control step of displaying the object on predetermined display means according to display specification information that specifies a display status of the object,
wherein the display specification information includes a reference point, a picture size, and layer order specification data for each picture of said plurality of pictures, said layer order specification data providing an order for displaying the plurality of pictures extracted from the motion picture scenes;
an input step of inputting a modification instruction for modifying the display status of the object displayed on said display means; and
a specification content modification step of modifying specified content of the display specification information according to the modification instruction.

5. A display status modifying program for letting a display status modifying apparatus execute a display status modifying method comprising:
a reception step of receiving from outside an object including a plurality of pictures of an arbitrary shape extracted from motion picture scenes;
a display control step of displaying the object on predetermined display means according to display specification information that specifies a display status of the object,
wherein the display specification information includes a reference point, a picture size, and layer order specification data for each picture of said plurality of pictures, said layer order specification data providing an order for displaying the plurality of pictures extracted from the motion picture scenes;
an input step of inputting a modification instruction for modifying the display status of the object displayed on said display means; and
a specification content modification step of modifying specified content of the display specification information according to the modification instruction.

6. A storage medium storing a display status modifying program for letting a display status modifying apparatus execute a display status modifying method comprising:
a reception step of receiving from outside an object including a plurality of pictures of an arbitrary shape extracted from motion picture scenes;
a display control step of displaying the object on predetermined display means according to display specification information that specifies a display status of the object,
wherein the display specification information includes a reference point, a picture size, and layer order specification data for each picture of said plurality of pictures, said layer order specification data providing an order for displaying the plurality of pictures extracted from the motion picture scenes;
an input step of inputting a modification instruction for modifying the display status of the object displayed on said display means; and
a specification content modification step of modifying specified content of the display specification information according to the modification instruction.

7. A picture providing apparatus comprising:
object extraction means for extracting an object including a plurality of pictures of an arbitrary shape extracted from motion picture scenes;
display specification information generation means for generating display specification information that specifies a display status of the object and in which modification of specified content of the display status is allowed,
wherein the display specification information includes a reference point, a picture size, and layer order specification data for each picture of said plurality of pictures, said layer order specification data providing an order for displaying the plurality of pictures extracted from the motion picture scenes; and
transmission means for transmitting the object and the display specification information.

8. A picture providing method comprising:
an object extraction step of extracting an object including a plurality of pictures of an arbitrary shape extracted from motion picture scenes;
a display specification information generation step of generating display specification information that specifies a display status of the object and in which modification of specified content of the display status is allowed, wherein the display specification information includes a reference point, a picture size, and layer order specification data for each picture of said plurality of pictures, said layer order specification data providing an order for displaying the plurality of pictures extracted from the motion picture scenes; and a transmission step of transmitting the object and the display specification information.

9. A picture providing program for letting a picture providing apparatus execute a picture providing method comprising:

an object extraction step of extracting an object including a plurality of pictures of an arbitrary shape extracted from motion picture scenes;

a display specification information generation step of generating display specification information that specifies a display status of the object and in which modification of specified content of the display status is allowed, wherein the display specification information includes a reference point, a picture size, and layer order specification data for each picture of said plurality of pictures, said layer order specification data providing an order for displaying the plurality of pictures extracted from the motion picture scenes; and a transmission step of transmitting the object and the display specification information.

10. A storage medium storing a picture providing program for letting a picture providing apparatus execute a picture providing method comprising:

an object extraction step of extracting an object including a plurality of pictures of an arbitrary shape extracted from motion picture scenes;

a display specification information generation step of generating display specification information that specifies a display status of the object and in which modification of specified content of the display status is allowed, wherein the display specification information includes a reference point, a picture size, and layer order specification data for each picture of said plurality of pictures, said layer order specification data providing an order for displaying the plurality of pictures extracted from the motion picture scenes; and a transmission step of transmitting the object and the display specification information.

11. A picture providing system comprising a picture providing apparatus and a display status modifying apparatus, said picture providing apparatus comprising:

object extraction means for extracting an object including a plurality of pictures of an arbitrary shape extracted from motion picture scenes;

display specification information generation means for generating display specification information that specifies a display status of the object and in which modification of specified content of the display status is allowed, wherein the display specification information includes a reference point, a picture size, and layer order specification data for each picture of said plurality of pictures, said layer order specification data providing an order for displaying the plurality of pictures extracted from the motion picture scenes; and transmission means for transmitting the object and the display specification information;

said display status modifying apparatus comprising:

reception means for receiving the object and the display specification information;

display control means for displaying the object on predetermined display means according to the display specification information;

input means for inputting a modification instruction for modifying the display status of the object displayed on said display means; and specification content modification means for modifying specified content of the display specification information according to the modification instruction.

* * * * *